Nov. 30, 1954  D. G. JOHNSON ET AL  2,695,444
APPARATUS FOR SCREENING FRAMES BY A CONTINUOUS
PROCESS USING SCREENING ROLLS
Filed Aug. 15, 1949  20 Sheets-Sheet 1

FIG.1.

INVENTORS
DAVID G. JOHNSON
JOSEPH MAYER
BY Whittemore, Hulbert
& Belknap ATTORNEYS Nov. 30, 1954

D. G. JOHNSON ET AL 2,695,444

APPARATUS FOR SCREENING FRAMES BY A CONTINUOUS
PROCESS USING SCREENING ROLLS

Filed Aug. 15, 1949

*INVENTORS*
DAVID G. JOHNSON
BY  JOSEPH MAYER
Whittemore, Hulbert
& Belknap
ATTORNEYS

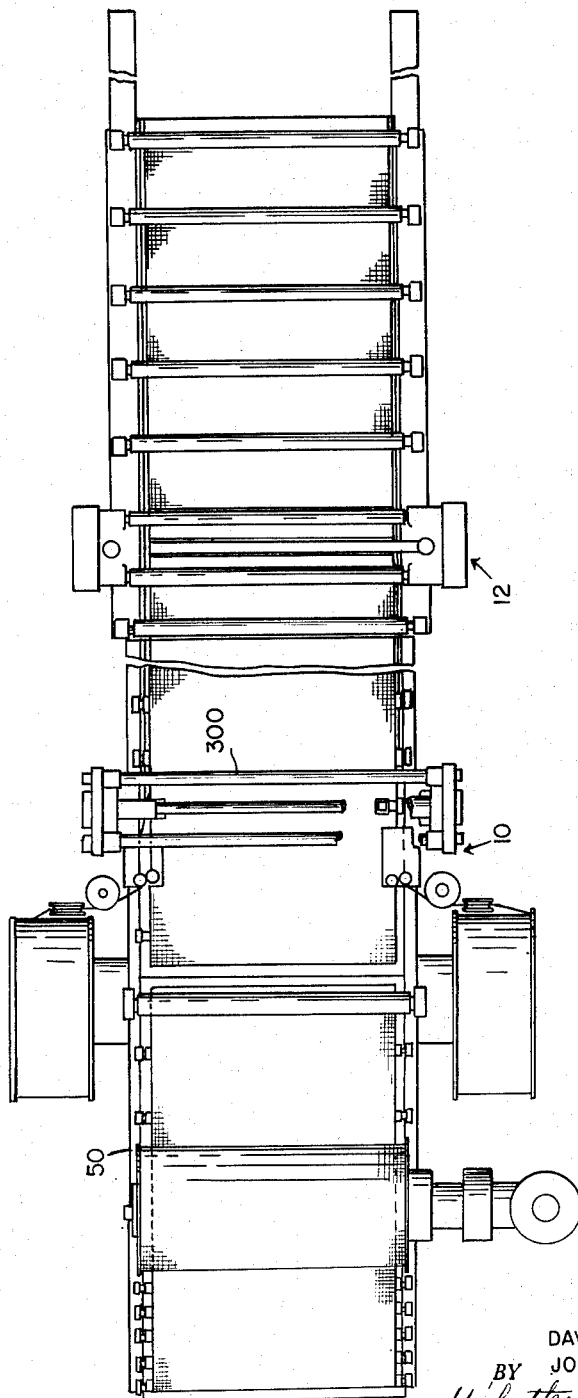

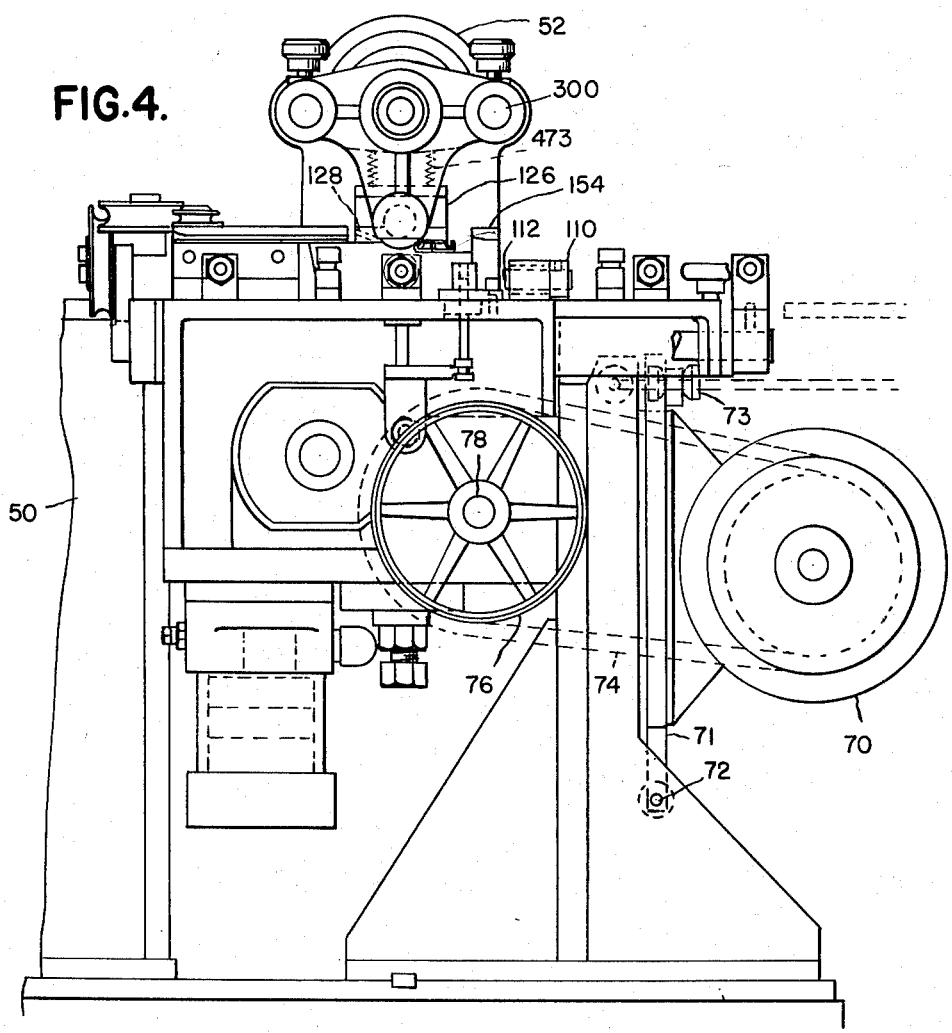
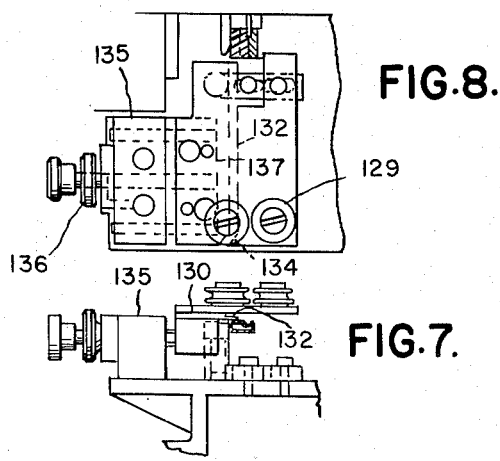

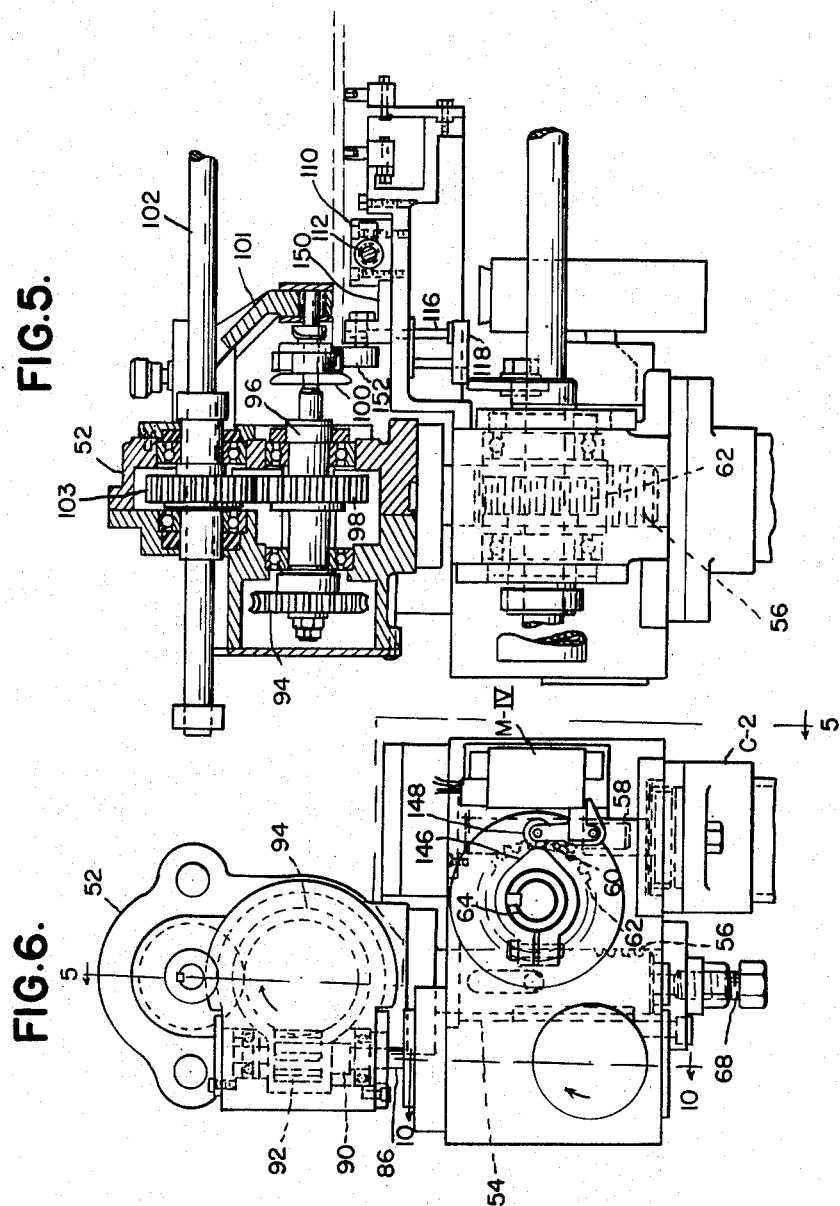

Nov. 30, 1954  D. G. JOHNSON ET AL  2,695,444
APPARATUS FOR SCREENING FRAMES BY A CONTINUOUS
PROCESS USING SCREENING ROLLS
Filed Aug. 15, 1949  20 Sheets-Sheet 6

INVENTORS
DAVID G. JOHNSON
JOSEPH MAYER
BY
Whittemore, Hulbert
& Belknap
ATTORNEYS

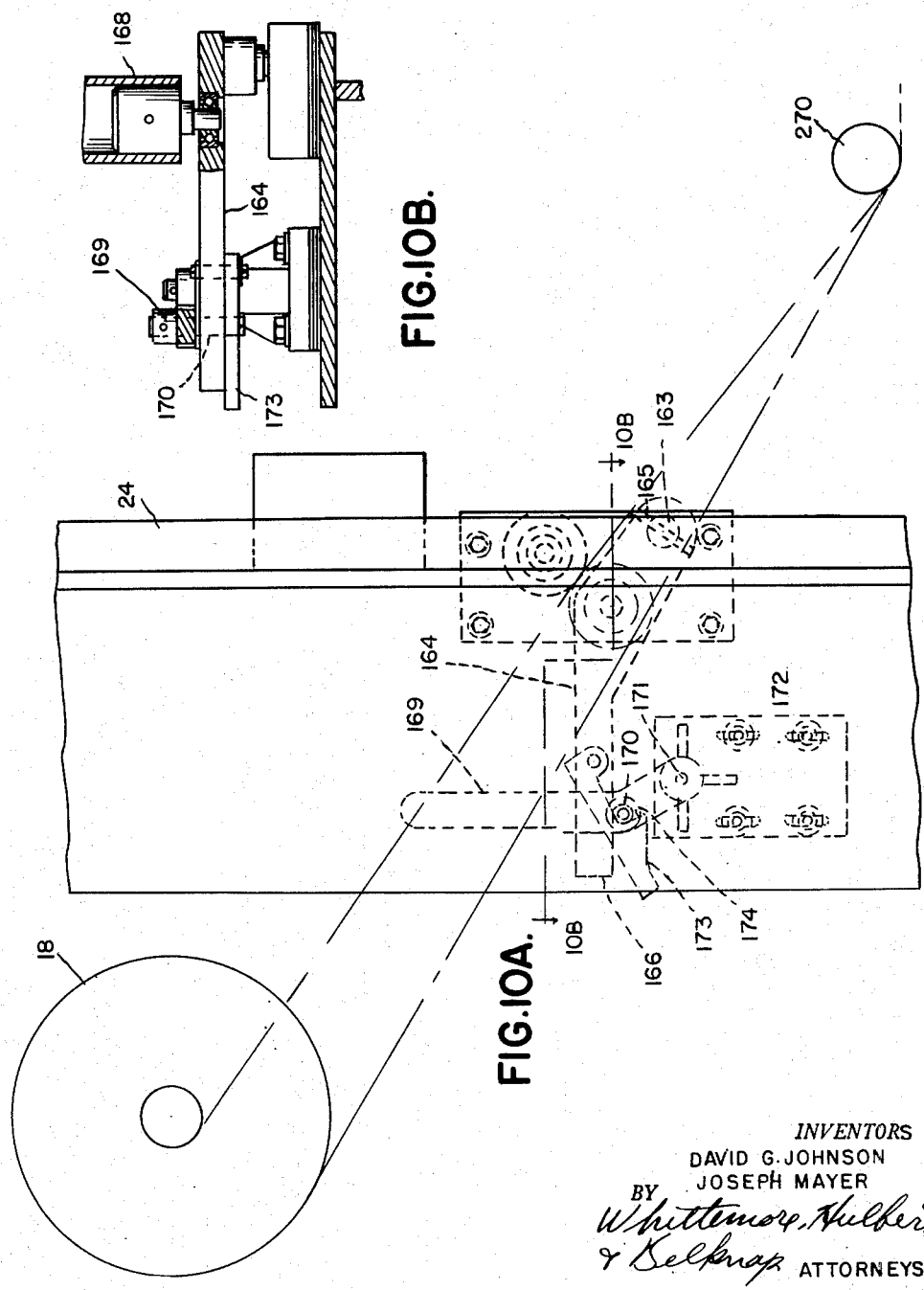

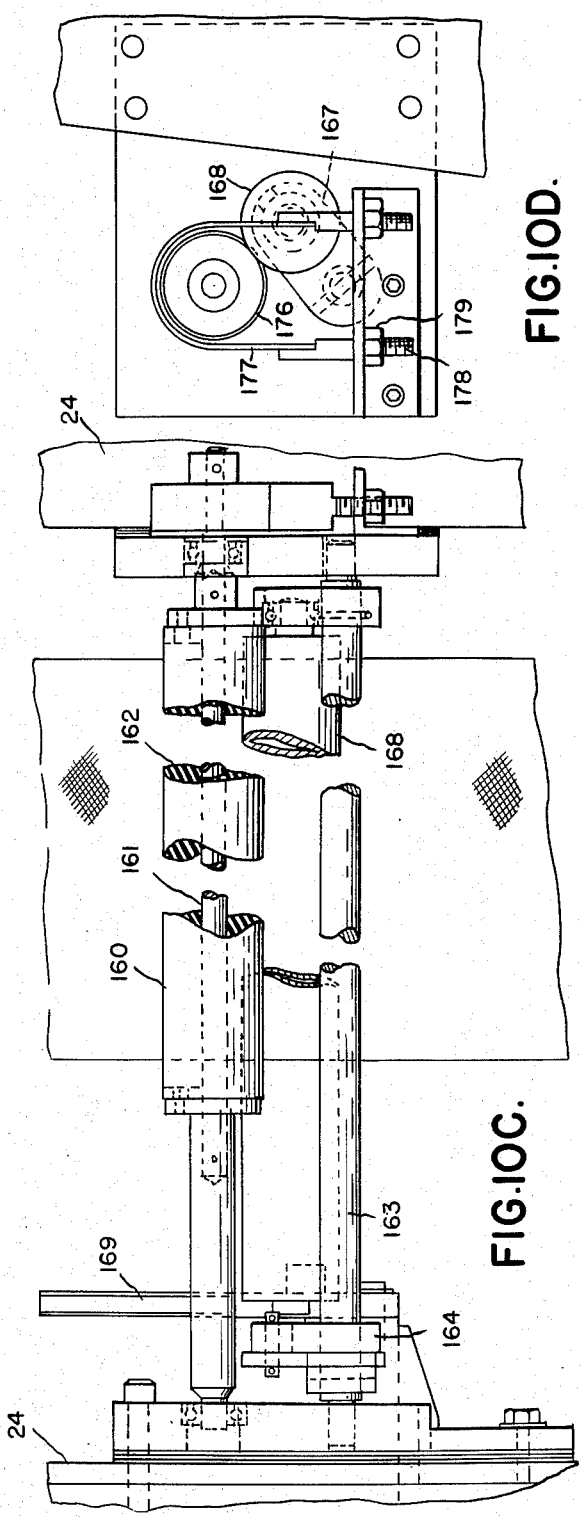

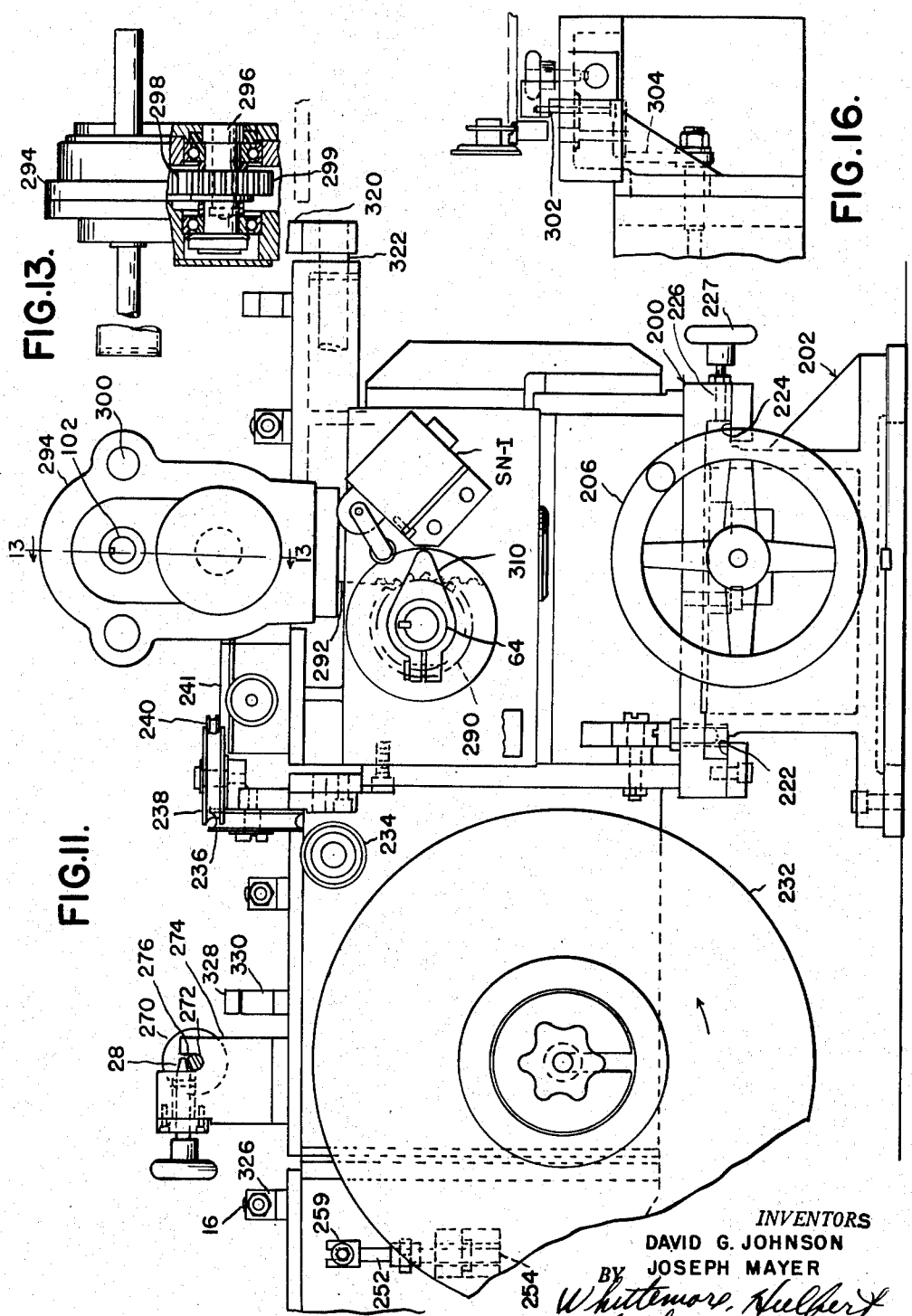

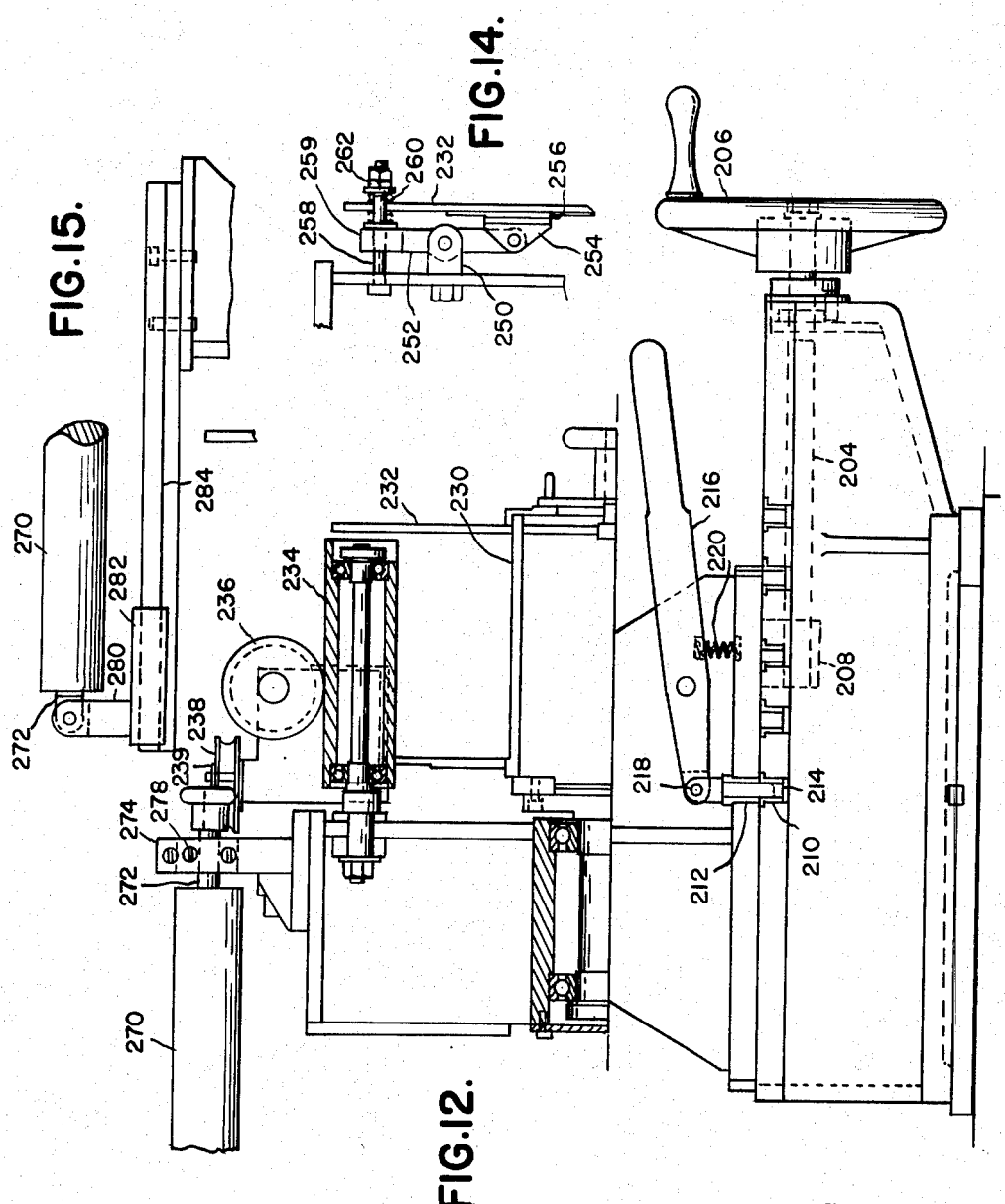

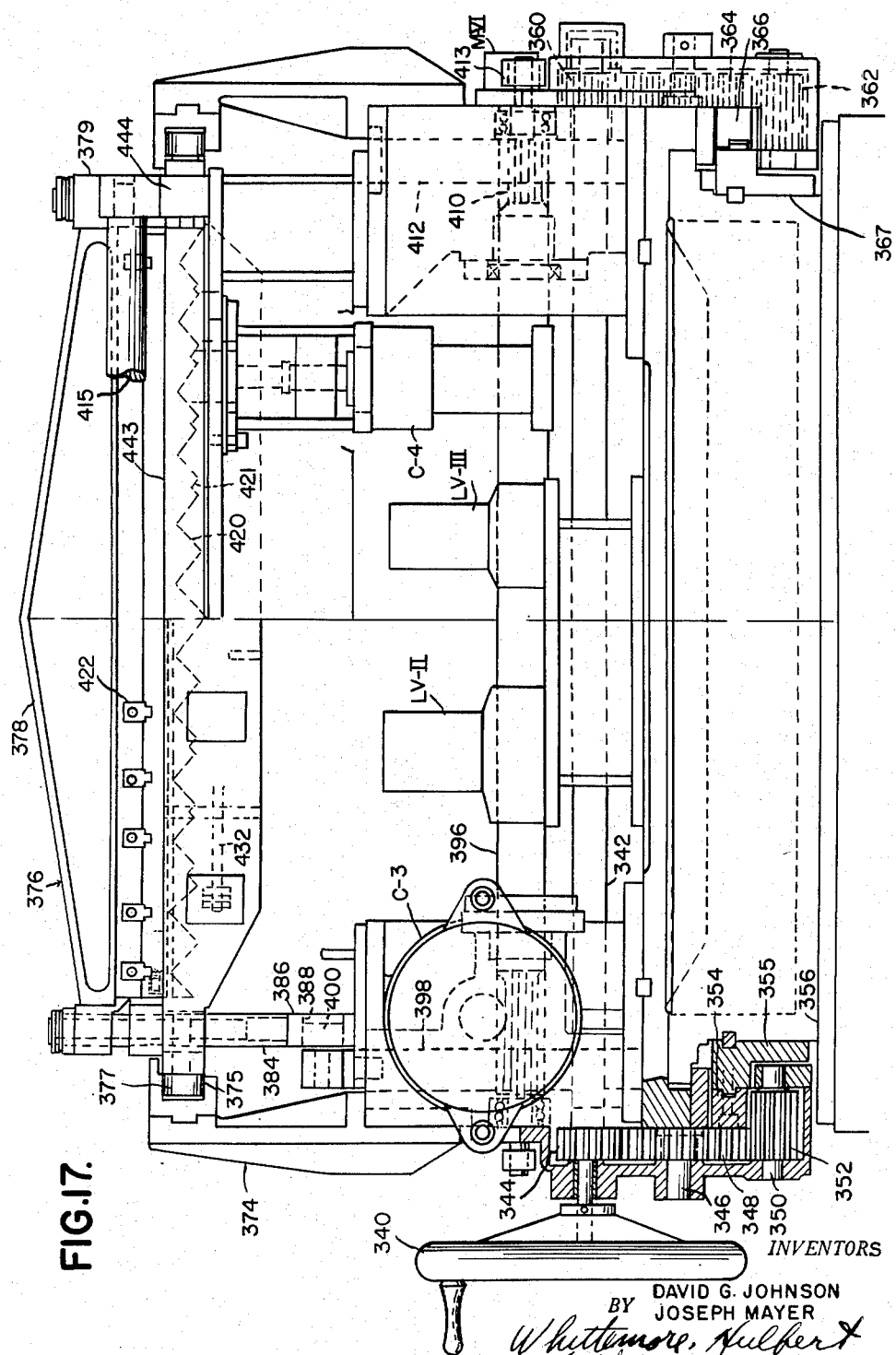

Nov. 30, 1954  D. G. JOHNSON ET AL  2,695,444
APPARATUS FOR SCREENING FRAMES BY A CONTINUOUS
PROCESS USING SCREENING ROLLS
Filed Aug. 15, 1949  20 Sheets-Sheet 12

INVENTORS
DAVID G. JOHNSON
JOSEPH MAYER
BY Whittemore, Hulbert
& Belknap
ATTORNEYS

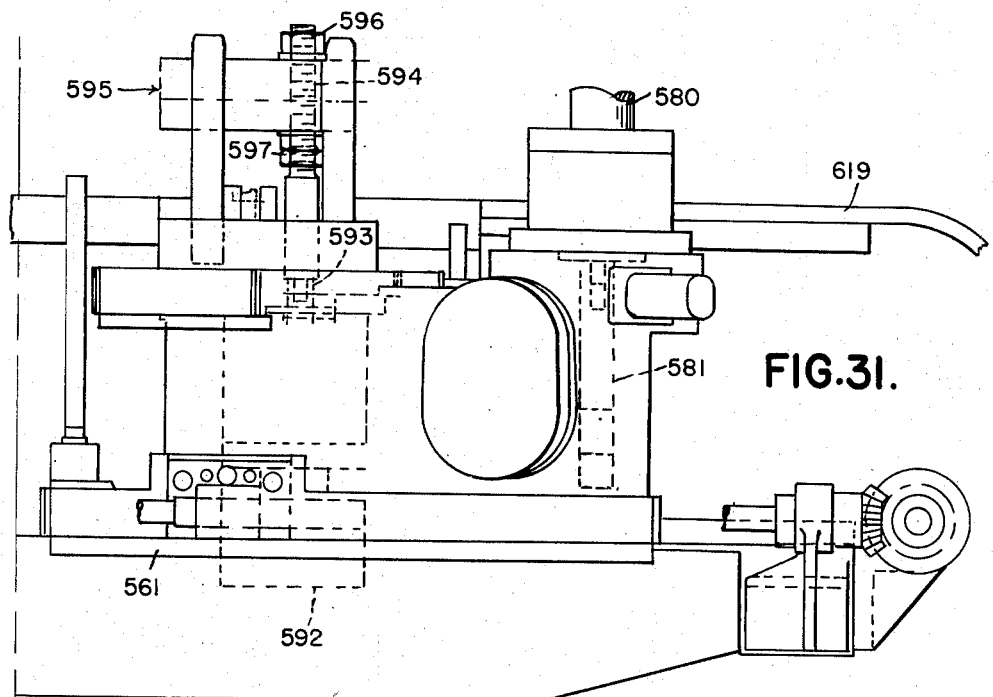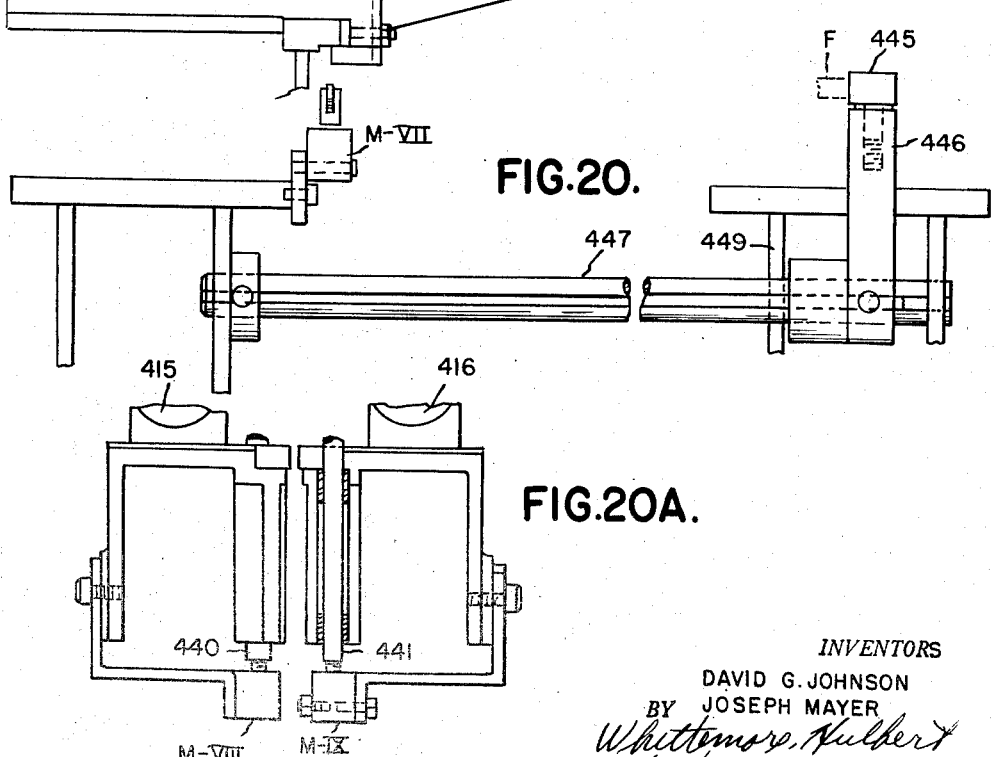

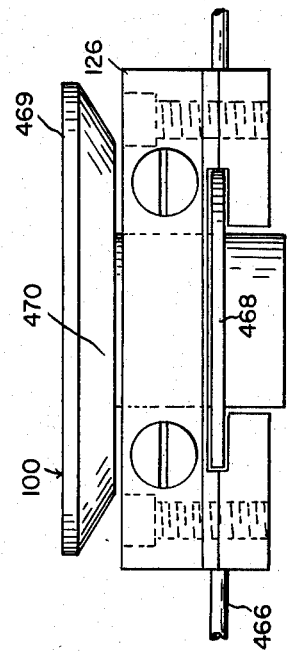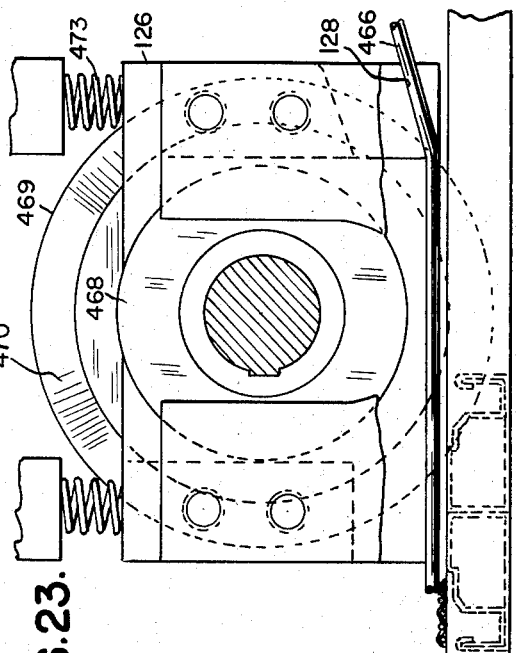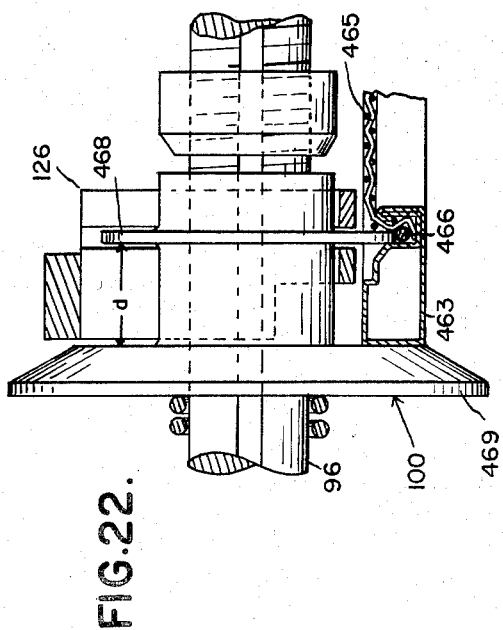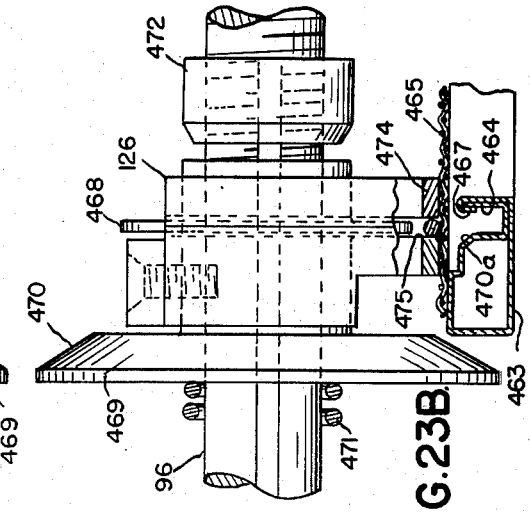

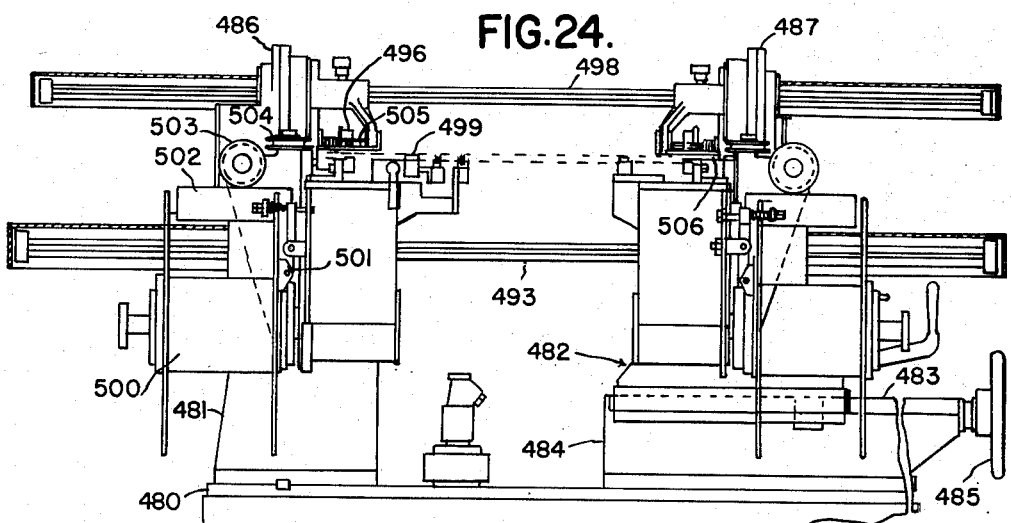
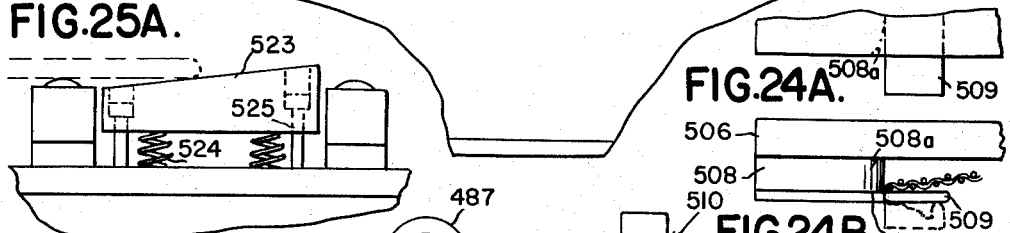
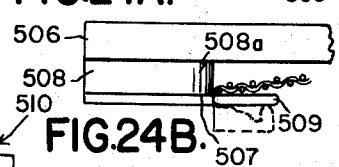
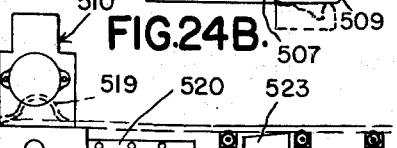
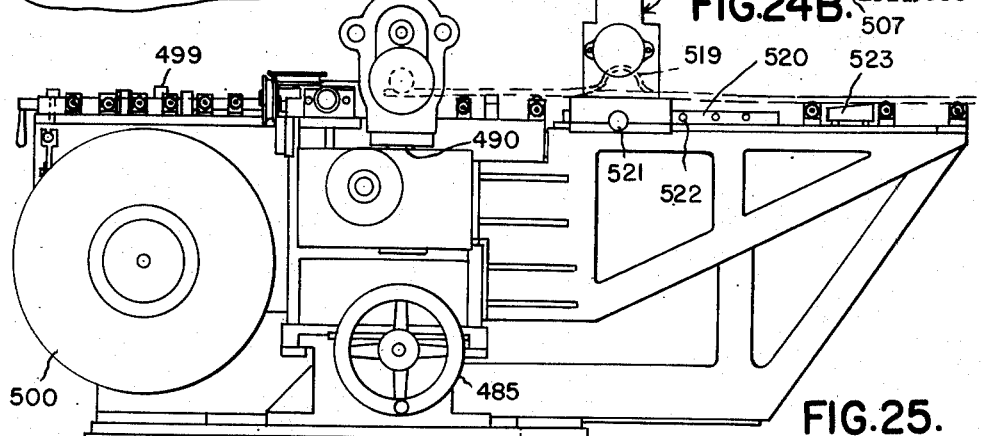

Nov. 30, 1954  D. G. JOHNSON ET AL  2,695,444
APPARATUS FOR SCREENING FRAMES BY A CONTINUOUS
PROCESS USING SCREENING ROLLS
Filed Aug. 15, 1949  20 Sheets-Sheet 17

*INVENTORS*
DAVID G. JOHNSON
JOSEPH MAYER
BY Whittemore, Hulbert
& Belknap ATTORNEYS Nov. 30, 1954  D. G. JOHNSON ET AL  2,695,444
APPARATUS FOR SCREENING FRAMES BY A CONTINUOUS
PROCESS USING SCREENING ROLLS
Filed Aug. 15, 1949  20 Sheets-Sheet 18

INVENTORS
DAVID G. JOHNSON
JOSEPH MAYER
BY
Whittemore, Hulbert
& Belknap
ATTORNEYS Nov. 30, 1954 D. G. JOHNSON ET AL 2,695,444
APPARATUS FOR SCREENING FRAMES BY A CONTINUOUS
PROCESS USING SCREENING ROLLS
Filed Aug. 15, 1949 20 Sheets-Sheet 20

INVENTORS
DAVID G. JOHNSON
JOSEPH MAYER
BY
*Whittemore, Hulbert*
*& Belknap* ATTORNEYS ча
United States Patent Office 2,695,444
Patented Nov. 30, 1954

2,695,444

APPARATUS FOR SCREENING FRAMES BY A CONTINUOUS PROCESS USING SCREENING ROLLS

David G. Johnson, Erie, Pa., and Joseph Mayer, Detroit, Mich., assignors to Detroit Steel Products Company, Detroit, Mich., a corporation of Michigan Application August 15, 1949, Serial No. 110,392

30 Claims. (Cl. 29—33)

The present invention relates to apparatus for applying screening material to screen frame. The screening material can be wire cloth, textile fabric, plastic or other material suitable for covering the opening of a frame.

It is an object of the present invention to provide apparatus for facilitating the application of screening material to screen frames, and particularly to metallic screen frames.

It is a further object of the present invention to provide apparatus for simultaneously applying screening material to screen frames and trimming excess screening material.

It is a further object of the present invention to provide apparatus for applying screening material to frames which includes means for automatically providing a predetermined slack in the screening material to be taken up during the subsequent mechanical application of the screening material to grooves or channels in the frame.

It is a further object of the present invention to provide apparatus adapted to roll screening material into two opposite sides of a frame simultaneously.

It is a further object of the present invention to provide automatic apparatus in which screen frames may be advanced continuously, and screening material from a continuous supply, applied thereto and thereafter severed between adjacent frames.

It is a further object of the present invention to provide apparatus for applying screening material to screen frames which comprises applying a continuous strip of screening material to a succession of frames, and severing the screening material between adjacent frames so as to provide excess material for providing slack when the remaining two sides of the screen are processed.

It is a further object of the present invention to provide apparatus for pressing screening material and splining material into the intersecting corners of grooves or channels provided in the screen frame.

It is a feature of the present invention to provide apparatus for rolling screening material such as wire cloth into grooves or channels provided in screen frames by employing a roll having a peripheral flange adapted to enter the groove or channel in combination with a bevel guide shoulder on the roll, effective to applying shearing pressure between the flange of the roll and a corner of the frame channel.

It is a further feature of the present invention to provide a roll of the character described on a drive shaft for floating movement axially thereof to permit the roll to accommodate itself to screens of slightly different dimensions.

It is a further feature of the present invention to provide a guide for a splining material, such for example as a suitable plastic material, which conducts the splining material substantially to the point where the flange of the guide roll enters the frame channel.

It is a further feature of the present invention to provide apparatus having automatic means for positioning the screen frames, for raising and lowering the screening rolls, and for actuating the cutting knife for severing the screening material between adjacent frames.

It is a further feature of the present invention to provide a cut-off knife for severing the screening material between adjacent frames which is automatically movable by the screen frames, to be positioned directly over the point of abutment between adjacent screen frames.

It is a further feature of the present invention to provide apparatus of the character described which is automatically adjustable to accommodate screens of different widths or lengths.

It is a further feature of the present invention to provide mechanism for applying the screening material and/or splining material into the corners of the frames, in which direct application of a succeeding frame to the machine pushes the finished frame out of the machine in a simple sliding movement.

It is a further feature of the present invention to provide apparatus for applying the screening material to the corners of the frame channels in which the die heads are sequentially movable to first locate the screen frame against stationary abutments, and thereafter to engage the opposite end of the screen.

It is a further feature of the present invention to provide apparatus of the character last described in which the die heads are arranged in pairs, the individual die heads all being movable diagonally inwardly with respect to the machine, and means for effecting sequential operation of the die heads in pairs so as to first move the screen accurately into position against stops by movement of one pair of die heads, and thereafter to move the remaining pair of die heads into operating position.

It is a further feature of the present invention to provide apparatus for applying screening material and/or splining material to the corners of the frame channels, comprising punch elements including beveled guide portions adapted to engage the outside edges of the screen bars, the punches being universally adjustable to be guided thereby into accurate registry with the frame channels.

It is a further object of the present invention to provide apparatus for applying screening material to channeled frames which comprises blade elements including angularly disposed portions adapted to enter intersecting corners of the grooves or channels in the frame, and rectilinear portions adapted to enter straight groove or channel portions spaced from the corners of the frame. It is thus possible to apply a complete section of screening material to an entire frame in a single pressing operation.

Other objects and features of the invention will become apparent as the description proceeds, especially when taken in conjunction with the accompanying drawings, wherein:

Figure 1 is a side elevation of the mechanism for performing the first operation of applying continuous screening material to a succession of frames and severing the screening material between adjacent frames.

Figure 3 is a plan view of the apparatus shown in Figure 1.

Figure 4 is a side elevation of the left hand side of the machine for rolling the screen in the frames.

Figure 5 is a section on the line 5—5, Figure 6.

Figure 6 is a fragmentary side elevation reversed from the side elevation illustrated in Figure 4.

Figure 7 is a fragmentary end view of the structure shown in Figure 4.

Figure 8 is a fragmentary plan view of the structure shown in Figure 7.

Figure 10A is a fragmentary side elevation illustrating mechanism for adjusting tension of the screen.

Figure 10B is a fragmentary section on the line 10B—10B, Figure 10A.

Figure 10C is a fragmentary rear elevation of the tensioning mechanism illustrated in Figure 10A.

Figure 10D is a fragmentary end view looking to the left in Figure 10C.

Figure 11 is a side elevation of the right hand side of the rolling machine illustrated in Figure 1.

Figure 12 is a front elevation of the mechanism illustrated in Figure 11.

Figure 13 is a fragmentary section on the line 13—13, Figure 11.

Figure 14 is a fragmentary front elevational view showing brake mechanism applied to the spline reel.

Figure 15 is a fragmentary front elevational view illustrating the attachment at the left hand side of the machine of the screen cloth roll.

Figure 16 is a fragmentary front elevational view illustrating the screening roll and automatic stop mechanism associated therewith.

Figure 17 is a rear elevation of the cut-off mechanism illustrated in Figure 1.

Figure 20 is a diagrammatic view illustrating adjustable side guides provided at one side of the cut-off machine.

Figure 20A is a detailed view illustrating mounting of a pair of control switches associated with the cut-off mechanism.

Figure 22 is a fragmentary section through the spline guide illustrating the manner in which the screening roll cooperates with the screen.

Figure 23 is an end view of the screen roll and spline guide shown in Figure 22 with the roll in raised position.

Figure 23A is a plan view of the structure shown in Figure 23.

Figure 23B is a side elevation partly in section looking to the left in Figure 23.

Figure 24 is a front elevation of the machine employed for the second rolling operation.

Figure 24A is an enlarged fragmentary plan view of the buncher guide provided in the machine illustrated at Figure 24.

Figure 24B is a fragmentary front elevation of the buncher guide.

Figure 25 is a side elevation of the mechanism shown in Figure 24.

Figure 25A is an enlarged side elevation of the brake mechanism applied to the structure shown in Figure 25.

Figure 31 is an enlarged side elevation of the die mechanism at one corner of the machine illustrated in Figures 29–30.

Figure 2:
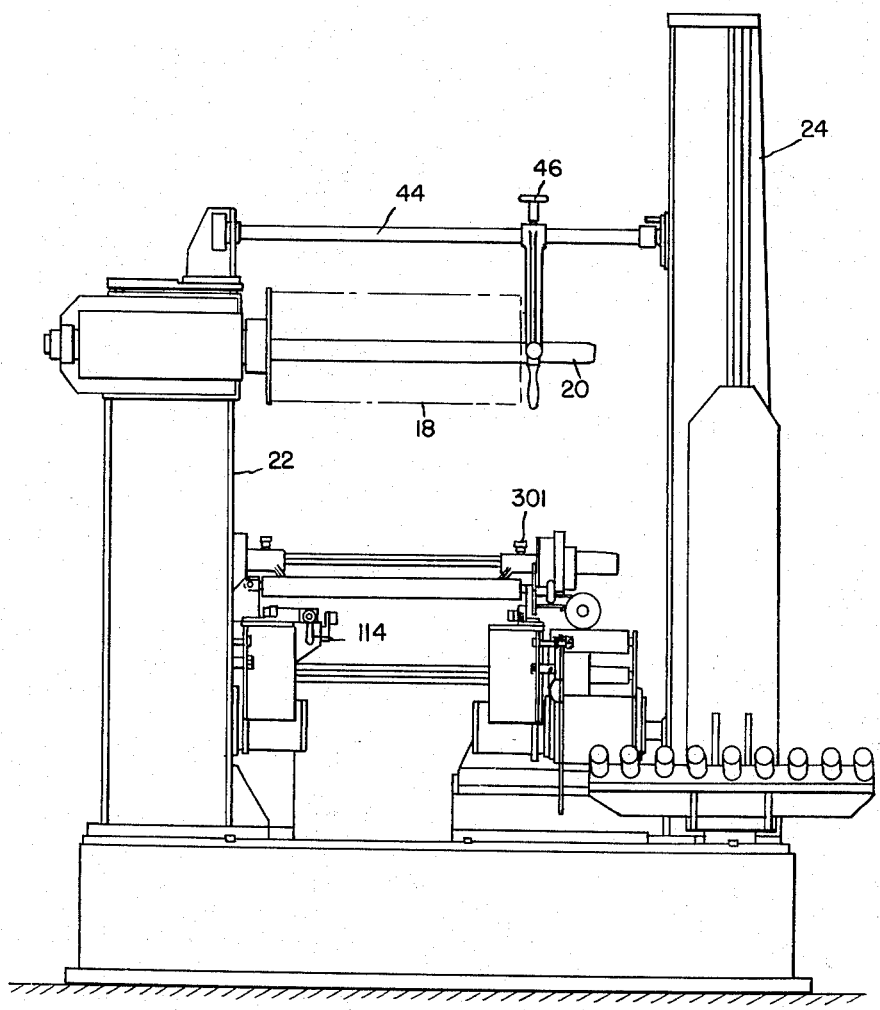
Figure 2 is a front elevation of the machine shown in Figure 1.

Before referring specifically to the drawings which illustrate a preferred embodiment of the present invention, a general description of the entire process will be given.

The invention relates generally to the application of screening material such as wire cloth to screen frames and preferably to screen frames in which the bars of the frame are formed of metal. According to the present invention, the application of screening material to the frames is carried out in three phases and for this purpose three separate machines are employed.

In the first operation, a machine is provided supporting a continuous roll of screening material such as wire cloth thereon and additionally supporting a pair of reels carrying a continuous supply of a suitable splining material. The splining material may be any suitable material but excellent results have been obtained when a plastic material is employed. A series of screen frames are advanced through the machine into contact with the screening material and the splining material, and screening and splining rolls are brought into operation to force the screening material and splining material into the grooves or channels of the frame. This operation also trims excess width of screening material from the frame. If preferred, the machine can be used with screening material cut to length before entering the machine, in which case the cut-off knife will not function.

In order to provide precisely the desired tension in the finished product, a certain amount of slack is provided in the screening material transversely of the frame prior to the rolling operation. During the rolling operation the screening material is forced downwardly into the channels, thus setting up a transverse tension in the screening material. In order that the transverse tension thus set up in the screening material shall not produce inwardly bowed side bars of the frame, it is within the contemplation of the present invention that the frame bars shall be outwardly bowed initially and the tension of the screen will be just sufficient to cause the frame bars to become straight. However, if the bars of the screen frame are of the preferred rigidity, this initial outward bowing of the bars will not be necessary.

The screen frames are advanced through the machine as a result of positive turning of the screening and splining rolls. Screen frames ahead of the particular frame in contact with the rolls are pushed ahead by engagement with succeeding frames. Alternatively, separate means may be provided for pushing the screen frames through the machine, in which case the screening and splining rolls will be rotated by their engagement with the channels in the screen frame. While the former arrangement in which the rolls are positively driven is preferred, it is to be understood that the latter arrangement, in which the frames are directly propelled through the machines by means independent of the rolls is also within the scope of the present invention.

The machine for carrying out the first operation includes a cut-off mechanism adapted to sever the continuous screening and splining material between adjacent frames.

As the frames emerge from the first operation each frame has a section of screening material applied thereto and rolled and preferably splined into channels along two opposite sides thereof, the application of the screening material and splining material to the channels of the frame however, not extending completely to the ends of the channels.

The second operation is carried on a separate machine into which the individual screen frames are introduced so as to roll the edges of the screening material and splining material into the two remaining sides. This operation is generally similar to the first operation except that it is of course unnecessary to sever screening material between adjacent frames. However, it is necessary to sever the continuous splining material between adjacent frames and suitable mechanism for accomplishing this purpose automatically is provided.

The machines for carrying out the first and second operations are largely automatic in operation, requiring only that the operator introduce screen frames into the machines and close a starting switch, after which the operation is continuous and fully automatic to complete the rolling of the frame last introduced and to sever the screening and/or splining material between adjacent screen frames.

As the frames emerge from the second operation each frame has secured thereto an area of screening material which is rolled into grooves or channels along all four sides, but the screening material is not forced into the corners where the grooves or channels of the frame intersect.

The third operation is the application of the screening and splining material to the intersecting channel corners. This is carried out in a machine which has four punches, each of which is right angular in shape and is adapted to enter into a corner of the screen frame. The individual punches include camming surfaces and are mounted for universal movement so that they are guided into exact registry with the corners of the frame channels by engagement between the inclined surfaces of the punches and the outside surfaces of the screen frames. The punches are arranged to force the screening material fully into the corners of the frames, and also to sever excess screening and splining material. This mechanism is also semi-automatic, requiring only that the operator introduce the frame into the machine in approximate operating position and close a pair of starting switches. Thereafter, clamping means operate sequentially to move the frame to operating position and to clamp the frame in such position. After the frame is firmly clamped in desired position, the punches move downwardly to complete the screen and thence move upwardly and the die heads retract diagonally outward to provide access for replacing the completed screen with another. The machine is arranged such that as the new frame is inserted into the machine it pushes the old screen out with a simple sliding movement.

According to the present invention, mechanism is provided by means of which screen frames may be supplied with screening material in a manner characterized by the substantial uniformity of the product and the high production obtainable due to the rapidity with which the operation takes place.

In the succeeding description, the mechanism for carrying out the first, second and third operations will be discussed separately under appropriate headings and subheadings.

FIRST OPERATION

The mechanism for rolling the screening material into the frames along two sides thereof and thereafter severing the screening material between adjacent frames, is illustrated in Figures 1–21.

Referring now to Figures 1–3 the mechanism comprises a rolling machine 10 for rolling the screening material and splining material into the frames, and a cut-off machine 12 for severing the screening material between adjacent frames. The rolling machine 10 comprises a horizontal table 14 provided with a plurality of supporting rollers 16 located at each side of the machine, on which a series of frames F are adapted to be advanced.

The screening material is provided in the form of a continuous roll 18 supported on a shaft 20 extending laterally of the machine from a supporting column 22. Inasmuch as the roll of screening material is very heavy, power means are provided for elevating a roll of screening material into operating position. This means comprises a column 24 having guide rods 26 thereon and a vertically movable hoisting mechanism indicated generally at 28. This mechanism comprises a cradle 30 provided with a plurality of rollers 32 on which the roll of screening material is supported. Suitable means, such for example as an air cylinder 34, are provided for elevating the hoist to bring the axis of the roll of screening material 18 into alignment with the supporting shaft 20. At this time it may be moved axially along supporting rollers 32 onto the supporting shaft. Means are provided for retaining the roll of screening material in proper position on the shaft 20 and this means comprises a lever 36 pivoted as indicated at 38 to the column 24 and provided with an abutment roller 40 which will retain the roll 18 in operative position.

Inasmuch as the machine is designed to accommodate screening material of different width, the lever 36 is carried by an arm 42 which is adjustable along a transverse rod 44 and which may be clamped in operating position thereon by a clamping screw 46.

In order to accommodate frames of different width, the left hand side of the rolling machine is stationary and means are provided for effecting transverse adjustment of the entire right hand side of the machine toward and away from the left hand side.

Rolling machine (left hand side)

The left hand side of the rolling machine 10 comprises a suitable frame structure indicated generally at 50, which may as illustrated be composed of welded structural elements. Mounted on the frame 50 for vertical movement relative thereto is a roll head 52, the head being guided for vertical movement by suitable bearings provided to cooperate with a vertically extending shaft 54 or king post (Figure 6) which is provided with rack teeth as indicated at 56 along one side thereof for effecting vertical motion of the head in a manner which will subsequently be described. Carried by the frame 50 is an air cylinder C-2 having a piston rod 58 extending upwardly therefrom which is provided with rack teeth as indicated at 60 along one side thereof. A pinion 62 is provided on a cross shaft 64 which extends across the machine to the adjustable right hand side thereof. However, at the left side of the machine the pinion 62 meshes with the rack teeth 56 on the shaft 54. Accordingly, vertical movement of the piston rod 58 will result in rotation of the pinion and corresponding opposite vertical movement of the shaft 54 and rolling head 52. In its lowermost position the rolling head determines the position of the screening roll in the grooves provided in the screen frame, and accordingly, it is important to control the precise position of the rolling head when it is in its lowermost position. This is conveniently accomplished by providing an abutment screw 68 to serve as a stop means for the lower end of the shaft 54 and thus to predetermine the position of the screening rolls in the frame.

The advance of the screen frames through the machine is accomplished by the screen rolls and accordingly, power means are provided for effecting rotation thereof. This means comprises a motor 70 mounted on a plate 71 which is hinged as indicated at 72. Adjustment of the plate 71 is accomplished by threaded adjusting means of conventional type indicated generally at 73. The motor 70 is connected by a vari-speed pulley, a V-belt 74 or the like, to a pulley 76 located on a shaft 78.

Figure 10:
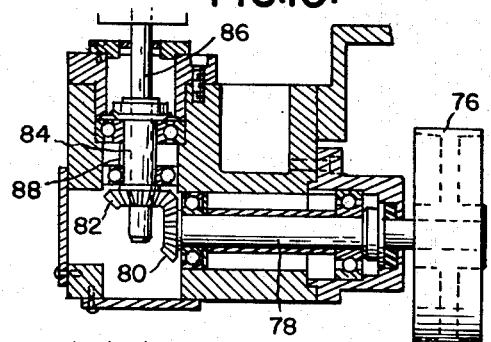
Figure 10 is a fragmentary section on the line 10—10, Figure 6.

Referring now to Figure 10 the shaft 78 is supported in suitable bearings and at its inner end carries a bevel gear 80 adapted to mesh with a second bevel gear 82 mounted on a vertical sleeve 84 supported for rotation in suitable bearings. A vertically extending shaft 86 is slidably received within the sleeve 84 and is keyed thereto as indicated at 88 to transmit driving rotation from the sleeve to the shaft in various vertical positions of the shaft relative to the sleeve.

Referring now to Figure 6 there is an enlarged portion 90 located within the head 52 which carries a worm 92. The enlarged portion 90 is engaged by suitable bearings so that the shaft 86 will move vertically as the head 52 is moved. Located within the head 52 is a worm gear indicated at 94 connected to a shaft 96 (Figure 5) which carries intermediate its ends a gear 98 and at its outer end the screening and splining roll 100. Beyond the screening roll 100 the end of the shaft 96 is supported by an outboard support member 101 which is removably secured to the head 52. Extending transversely of the machine from the left hand rolling head 52 to a corresponding rolling head at the right hand side of the machine (later to be described) is a cross shaft 102, driven by the gear 98 and a second gear 103 keyed to the cross shaft 102.

Means are provided for predetermining the position of the screen frames prior to downward movement of the rolling heads. A different condition exists when the first screen of a series is in position, and accordingly, a manual stop indicated at 110 is provided which is keyed or otherwise secured to a shaft 112 extending longitudinally of the machine and thence provided with an operating handle 114 as illustrated in Figure 2. After this stop has been employed to properly position the first screen of a series, it is moved to inoperative position and thereafter automatically operable stop means are employed. The automatically operable stop means comprises a plurality of vertically movable stop pins, one of which is indicated at 116 (Figure 5), which are actuated by a bracket 118, vertically movable with the head supporting post or rack 54.

Partly surrounding the screening rolls 100 is a spline guide 126 (Figure 4) having an inclined passage 128 for the reception of suitable splining material adapted to retain the edges of the screening material in the frame grooves. Identical means for supporting and guiding the splining material are provided at both sides of the machine and this structure will be described in greater detail in the ensuing description of the adjustable right hand side of the machine. However, Figure 8 illustrates a pair of cooperating guide rolls 129 through which the splining material advances directly to the inclined passage 128, which in turn leads the splining material directly to the spline and screen roll.

As the screening material is forced by the screening rolls into the grooves of the frame, the operation tends to tension the screening material transversely of the frames. In order that a uniform and predetermined tension shall be maintained in the screening material, a bunching guide is provided as best illustrated in Figures 4, 7 and 8. This buncher comprises a plate structure 130 presenting an inwardly facing groove 132. At the approach side of this groove the plate flares outwardly as indicated at 134. Accordingly, as the edge of the screening material is drawn past the flaring portion 134, the edges are moved inwardly by a predetermined distance, thus establishing a predetermined amount of slack in the spreening material transversely thereof. Obviously, the guide plates 132 will be constructed and adjusted so that the amount of slack thus provided will be taken up in the screening operation and a predetermined desired tension established in the screening material.

Mechanism for effecting transverse adjustment of the bunching mechanism is indicated as comprising a support block 135 carrying an adjusting screw 136 which is threaded into an adjustable block 137.

Figure 9:
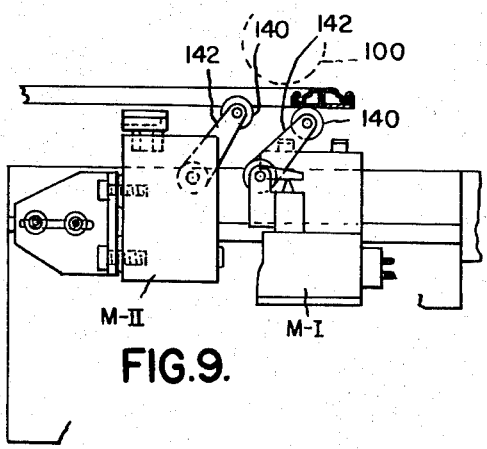
Figure 9 is a fragmentary view, diagrammatic in nature, showing the relationship of certain control switches in the mechanism.

Automatic controls for the machine are provided and the control system as a whole will be described subsequently. However, some of the control instrumentalities are illustrated in the figures under discussion. Figure 9 shows a series of two micro switches, M-I and M-II, each of which is provided with an actuating roller 140 carried by spring arms 142. These micro switches are located in position to be engaged by transverse elements of the advancing frames. Micro switch M-I is normally open and micro switch M-II is a two-position switch having a pair of normally open contacts and a second pair of normally closed contacts.

In addition, the cross shaft 64 which rotates to accomplish vertical movement of the rolling head 52 is provided with a cam actuator 146 (Figure 6) adapted to engage a roller 148 which operates another micro switch M-IV.

The frame carries a bracket 150 provided with a supporting roller 152 (Figure 5), which is located directly beneath the screening roll 100 so as to support the material on the screen frame at the point of maximum pressure as the screening material is rolled into place. The screening rolls 100 are forced with considerable pressure into the grooves in the frame, and accordingly, as the rolls are elevated they tend to lift the frame with them. In order to release the rolls from the frame, strippers 154 (Figure 4) are provided at each side of the machine, under which the edges of the screen frame advance. As the rolls 100 are elevated the strippers hold the frame down and permit the rollers to withdraw from the grooves.

It is essential to advance the screening material to the frames and screening rolls under a uniform tension, and the mechanism shown in Figures 10A–10D may be provided for this purpose.

Extending between the column members 24 is an upper stationary roll 160 which comprises an inner steel shaft 161 and a rubber coating 162. Also extending transversely between the column members 24 is a shaft 163. At the left hand end of the shaft as seen in Figure 10C there is a lever 164 which is pivoted to the shaft as indicated at 165. The lever 164 has an extending portion 166 which operates by manual means later to be described.

At the opposite side of the machine there is keyed or otherwise secured to the shaft 163, a short arm 167. Rotatably secured between the free end of the arm 167 and an intermediate portion of the lever 164 is a transverse roller 168 which as indicated in Figure 10C may be a hollow steel roller.

Adjacent the lever 164 is an operating handle 169 having a pin 170 extending therefrom. The operating handle 169 is pivoted as indicated at 171 to an adjustable block 172 mounted on the column 24.

The pin 170 is adapted to underlie the extending end 166 of the lever 164. Intermediate its ends the extending portion 166 of the lever carries a pivoted latch element 173 having a shoulder 174 adapted to engage over the pin 170 to retain the parts in the position illustrated in Figure 10A.

When it is desired to introduce the end of a new roll of screening material between the tensioning rollers 160 and 168, the latch 173 is lifted, handle 169 is rotated counterclockwise as seen in Figure 10A, thus causing the lever 164 to rotate counterclockwise about the pivot axis established by the shaft 163. This results in causing the lower roll 168 to move away from the upper stationary roll 160. After the screening material has been introduced between the rollers the operation is reversed. The pin 170 on the handle 169 effects direct rotation of the lever 164 and motion of the lever 164 is transmitted through the shaft 163 to the arm 167 at the opposite end of the machine.

In order to effect a predetermined tension in the screening material brake means are provided as illustrated in Figures 10C and 10D. At the right hand end of the machine as illustrated in Figure 10C, there is provided a brake cylinder 176. Extending around a portion of the periphery of the brake cylinder 176 is a flexible brake band 177, the ends of which are adjustably secured by means of bolts 178 and nuts 179. By virtue of this arrangement a predetermined resistance to rotation of the roll 160 may be obtained.

*Rolling machine—right hand side*

Referring now to Figures 1–16, there is illustrated the right hand side of the rolling machine which cooperates with the left hand side previously described.

In the first place, the right hand side of the rolling machine comprises a frame structure generally indicated at 200 which as illustrated, may be built up of welded structural parts. This frame structure is adjustable transversely toward and away from the frame 50 at the left hand side of the machine on a fixed support base structure 202. In order to accomplish transverse adjustment of the right hand frame 200 the base 202 is provided with an adjusting screw 204 operatively connected to a hand wheel 206 and the transversely adjustable frame 200 has depending therefrom an adjusting nut 208 which receives the adjusting screw 204. In order to lock the frame 200 in definite predetermined position corresponding to known standard widths of screen frames, the base 202 is provided with a plurality of openings having bushings 210 located therein. Extending through a bushing 212 provided in the bottom plate of the adjustable frame 200, is a locating pin 214. Operating lever 216 is provided which is pivoted to the frame at 218 and is connected at its opposite end to the pin 212 for effecting vertical movement thereof. A compression spring 220 is provided which normally retains the lever 216 in position to keep the locating pin 214 in the bushing 210. The frame 200 is adjustable along ways indicated at 222 and 224 in the base, and a screw 226 is provided connected to a handle 227 for locking up the frame 200 after it has been moved to adjusted position.

The splining material is mounted on a roll 230 which includes an enlarged cover disc 232. The splining material is drawn off from the roll by the advance of the frames and passes around an elongated guide roll 234 and thence around a first guide roller 236, a second guide roller 238, and thence between a pair of guide rollers 240 which are a counterpart of the pair of guide rolls 129 previously described. The guide rollers may have retainer clips 239, one of which is indicated in Figure 12, to retain the relatively stiff splining material on the guide rollers. A spline guide block and screen buncher are provided which are identical with those provided at the opposite side of the machine, the buncher being illustrated at 241.

A friction brake is provided to prevent over-running of the reel of splining material. This is best illustrated in Figures 11 and 14. This comprises a pivot bracket 250 to which is pivoted a lever 252 carrying a brake shoe 254 provided with brake lining as indicated at 256. At the opposite end of the lever 252 is a guide pin 258 passing through a yoke 259 at the end of the lever, carrying a compression spring 260 engaging the end of the lever at one side and an adjustable abutment 262 at the other side. The spring 260 applies the brake shoe 254 to the cover plate 232 of the reel and prevents over-running.

The screening material roller 270 extends transversely of the machine and is mounted on a shaft 272 as seen in Figures 12 and 15. Inasmuch as the spacing between the right and the left hand side of the machine may vary, the screening material rolls are adjustable. The shaft 272 is supported at the right hand side of the machine in a bracket 274 (Figure 11), having a recess 276 formed therein. A spring pressed keeper pin 278 is carried by the bracket, the point of the pin being adapted to overlie the end of the shaft 272.

At the opposite side of the machine, as seen in Figure 15, the left hand end of the shaft 272 is supported on a bracket 280 carried by a slidable block 282 mounted on a stationary bar 284. As the right hand side of the machine is moved toward the left, block 282 slides outwardly on bar 284, moving the left hand end of roll 270 to the left.

The cross shaft 64 which is rotated to effect vertical movement of the left hand rolling head 52, extends to the right hand side of the machine and carries a gear 290 which meshes with rack teeth formed on a supporting post 292 which effects vertical reciprocation of the right hand rolling head 294.

In like manner, the cross shaft 102 which effects rotation of the screening and splining rolls, extends into the right hand head 294 and effects rotation of the shaft 296 which carries the screening roll through the medium of meshing gears 298 and 299. The heads 52 and 294 are tied together by tie rods 300, retained in place by clamping screws 301.

The automatically operable locating pin 116 at the left hand side of the machine, has a counterpart in the pin 302 (Figure 16), the pin being actuated by a bracket 304 which is vertically movable with the rack member 292.

The cross shaft 64 carries at its end a cam 310 which is adapted to actuate a snap lock switch SN–I, as the rolling heads 52 and 294 reach upper position after completion of rolling a screen, and as will subsequently be described, actuation of the switch SN–I initiates operation of the cut-off mechanism subsequently to be described.

The rolling machine is associated with a cut-off machine which is longitudinally adjustable relative thereto, and to provide for support of the frames when the cut-off machine is moved away from the rolling machine, additional roller supports 320 are provided which are carried on shafts 322 slidably supported in the frame. A corresponding construction is provided at the left hand side of the machine.

As the screen frames advance they are supported at their edges on the rollers 16, which are supported at brackets 326 at the right hand side of the machine and corresponding brackets at the left hand side of the machine. In addition, the sides of the screen frames are engaged by guide rolls 328 mounted on post 330, one of these being illustrated in Figure 11, and corresponding lateral guide rolls being provided at the opposite side of the machine. Obviously any equivalent guide means such as side rails may be substituted.

*Cut-off machine*

The cut-off machine is illustrated in Figures 17, 18, 19 and 20. The opposite sides of this machine are not relatively adjustable but the machine is designed to operate to sever the screening material and the splining material between adjacent frames, no matter what widths of frames are being provided with screening material.

The motive power for advancing the frames through the cut-off machine is furnished by the screening and splining rolls previously described, the screen frames ahead of the frame under the roll being pushed ahead by the frame in engagement with the roll.

However, means are provided for adjusting the cut-off machine longitudinally of the path of advance of the frames relative to the rolling machine in order to position the cut-off blade at the precise point where the space between adjacent edges of screen frames comes to rest. The mechanism for accomplishing this adjustment comprises a hand wheel 340 secured to a cross shaft 342, carrying a pinion 344 at its left side. A stub shaft 346 is carried by the frame and has mounted thereon an idler gear 348 meshing with the pinion 344. Also secured in the frame is a stub shaft 350 having gear teeth 352 thereon which mesh at one end with the gear 348 and which at the opposite end mesh with a rack 354 fixed to a bracket 355 carried by a stationary bed plate 356. The cross shaft 342 at the right hand side of the machine, carries a pinion 360 which drives a toothed member 362 through an idler gear 364. The teeth of the member 362 mesh at one end with a stationary rack 366 carried by a bracket 367 secured to the bed plate 356. Rotation of the hand wheel as will readily be apparent, results in movement of the frame of the cut-off machine toward or away from the rolling machine.

Figures 18, 19:
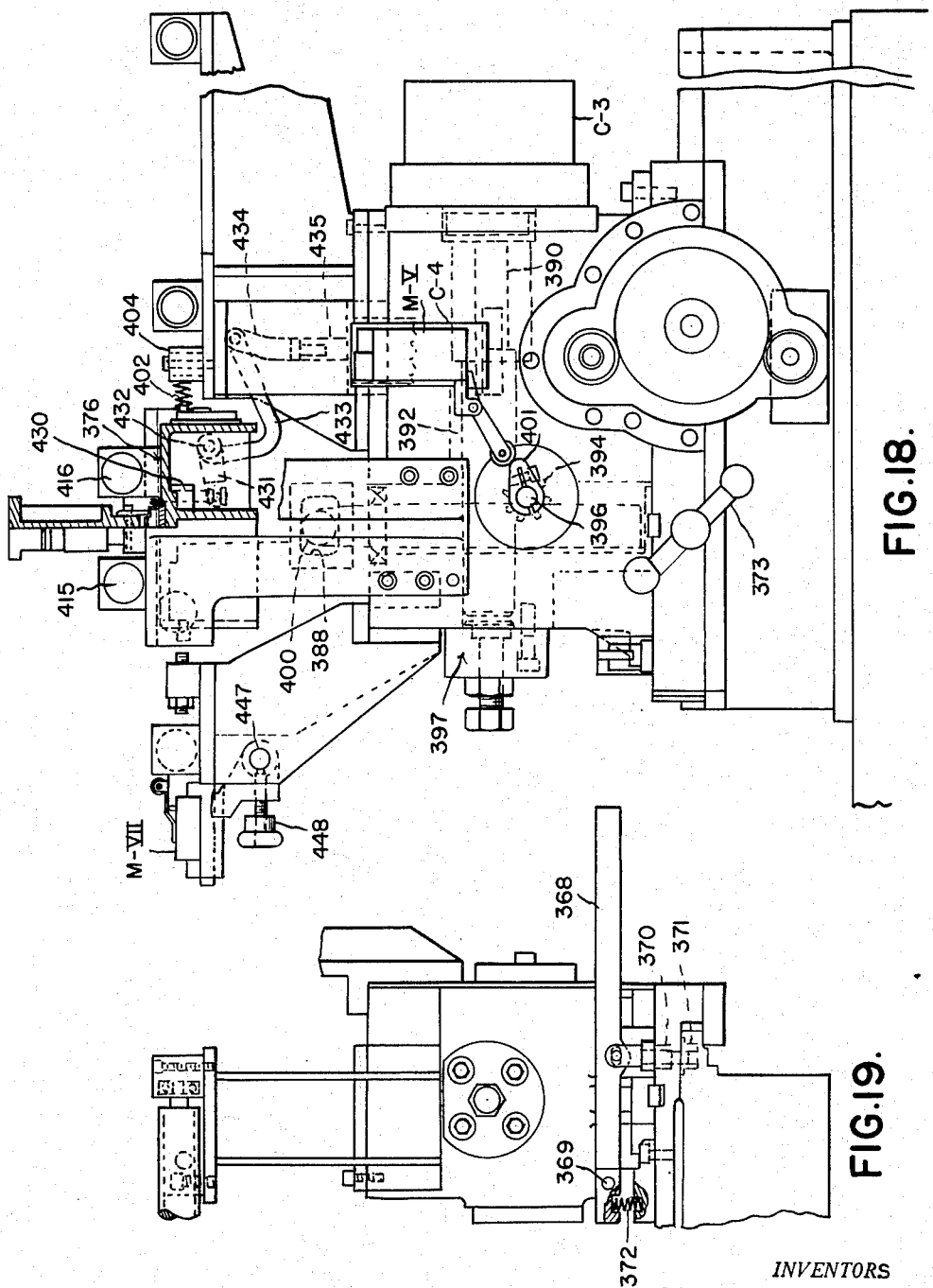
Figure 18 is a side elevation of the cut-off mechanism with parts in section.
Figure 19 is a fragmentary front elevational view of the cut-off machine.

In order to retain the cut-off machine at the proper position, it is provided with a lever 368 pivoted as indicated at 369 to the movable frame of the cut-off machine, and having intermediate its ends, a locating pin 370 adapted to be received within one of a plurality of locating bushings 371 carried by the bed plate 356. A compression spring 372 is provided to retain the pin 370 in locked position. Additional means are provided for clamping the frame to the ways on the bed plate 356, and include a clamping screw actuated by a handle 373 (Figure 18).

Extending upwardly from either side of the cut-off machine are a pair of supports 374, each of which is provided with a short horizontal trackway 375. The cut-off blade mechanism indicated generally at 376, is mounted for longitudinal movement in these trackways, supporting rollers 377 being provided for this purpose. The cut-off blade mechanism comprises a frame 378 having sleeves 379 at either end, to which are secured vertically extending shafts 384 terminating at their lower ends in blocks 386, having elongated slots 388 therein. Preferably, a cover 389 which may be of transparent plastic, is provided over the knife mechanism. Mechanism is provided for effecting vertical movement of the knife mechanism and this means comprises an hydraulic cylinder C–3 having a piston rod 390 connected to a horizontal rack 392, adapted to mesh with a pinion 394 carried by a cross shaft 396. An adjustable spring buffer indicated generally at 397 is provided to cooperate with the opposite end of the rack 392. Also meshing with the pinion 394 is a vertically extending rack 398 which at its upper end carries an outwardly extending roller 400 which is received within the elongated slot 388. The purpose of this arrangement is to permit transverse shifting of the cut-off mechanism relative to the balance of the cut-off machine so as to permit the knife blade to be accurately registered with the frames and at the same time to permit actuation of the knife mechanism in a vertical direction at any location.

Secured to the cross shaft 396 is an actuating dog 401 adapted to close normally open micro switch M–V as the cutting blade reaches its lowermost position.

A compression spring 402 is provided between the cut-off mechanism 376 and an abutment 404 to return the knife mechanism to initial position between cutting strokes.

The cross shaft 396 at the right side of the machine has a toothed portion 410 adapted to mesh with rack teeth on the shaft 412, which is connected to the right hand end of the cut-off mechanism by means similar to that shown at the left hand side thereof. At its right end (Figure 17) shaft 396 also carries dog 413 to operate a micro switch M–VI.

In order to hold the screen frames down, rolls 415 and 416 are provided at either side of the knife blade mechanism.

The knife blade mechanism comprises a saw-toothed blade 420 which is provided with a plurality of teeth having notches 421 in their end. The central tooth is the longest and enters the screening material first. This arrangement is provided so as to effect severing of the screening material without subjecting it to transverse strains which might tend to pull the screening material out of the grooves into which it has been seated by the screening rolls. In addition, the frame 378 carries a plurality of blades 422 which are designed to sever the splining material close to the ends of the grooves in the screen frames. A plurality of such knives are provided so as to have a pair of knives at the proper locations to accommodate screens of various standard widths.

In order to insure that when a knife blade 420 descends it will pass through a pair of abutting screen frames, there are provided vertically movable locating pins 430. Actuating means for these pins comprises levers 431 keyed or otherwise secured to a cross shaft 432, to which is connected a lever 433 having a link 434 pivoted to one end thereof, the link connecting to the piston rod 435 of a hydraulic cylinder C–4.

Located within the machine are a pair of solenoid operated four-way valves designated LV–II, and LV–III, whose purpose will subsequently appear.

As best seen in Figures 20A, a pair of micro switches

M-VIII and M-IX are provided having actuating pins 440 and 441 respectively. The pins 440 and 441 are located in the path of advancing screen frames and the micro switch M-IX is closed by the trailing edge of a first frame and the micro switch M-VIII is closed by the abutting leading edge of the following frame. In other words, unless there are a pair of frames with screening material to be severed by the knife blade, one of the micro switches M-VIII or M-IX remains open.

Since the right and left sides of the frames of the cut-off machine are not adjustable relative to each other, transverse supporting rolls 443 are provided, supported at their ends in bearings indicated at 444 in Figure 17. However, to guide the screen frames laterally, the mechanism illustrated in Figure 20 is provided. Guide rolls 445 are mounted on brackets 446 which are slidable on supporting rods 447 and may be clamped in adjusted position by a set screw 448 (Figure 18). In Figure 20 the bracket 446 is illustrated in extreme right hand position and it will be appreciated that it is movable to the left as seen in this Figure, frame element 449 being spaced rearwardly from shaft 447 as seen in the figure to permit such movement.

*Circuit and sequence of action*

Figure 21:
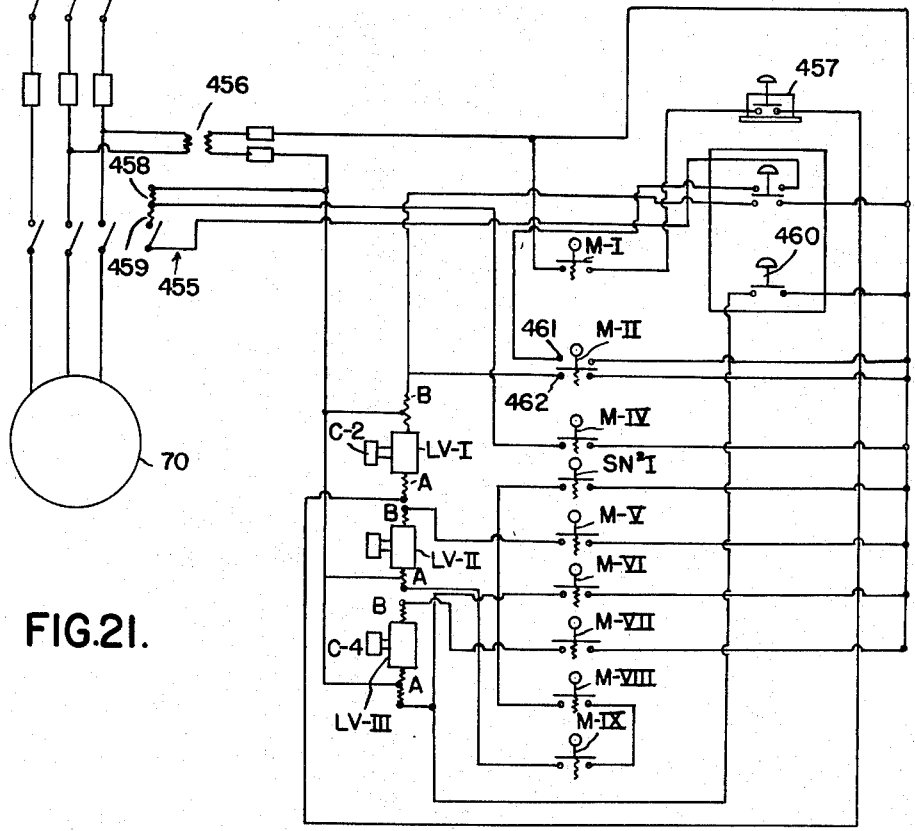
Figure 21 is a wiring and control diagram of the rolling and cut-off machines employed in the first operation.

Referring now to Figure 21 there is shown a wiring diagram illustrating the sequence of operation of the parts so far described. The motor 70 is illustrated as controlled by a magnetic contactor 455. A transformer 456 is connected across two wires of the 220 volt, three phase circuit which energizes the motor and supplies 110 volt current for the control circuit. This circuit comprises a foot switch 457 which is connected in series with the micro switch M-I. The micro switch M-I is normally open and will be closed when a frame is in position below the screening rolls. Closing of the foot switch 457 by the operator completes a circuit to solenoid A of air valve LV-I, which admits air to the air cylinder C-2 so as to lower the screening rolls into the grooves of the screen. As the air cylinder C-2 operates, the cross shaft 64 is rotated and when the screening rolls reach their lowermost position, the dog 146 (Figure 6) closes normally open micro switch M-IV. This completes the circuit to the solenoid 458 of the magnetic contactor, thus completing a circuit to the motor 70 and establishing a holding circuit through the coil 459.

Rotation of the screening rolls causes advance of the frame and the micro switch M-I opens but the circuit to the motor remains closed due to the holding circuit through the coil 459, which includes normally closed contacts 461 of micro switch M-II. It will be noted in Figure 9 that micro switch M-II is located in advance of the screening rolls 100. As the trailing edge of the first frame contacts micro switch M-II, the circuit through the holding coil 459 is opened at contacts 461 and the motor 70 is de-energized. The location of the micro switch M-II, as previously described, is adjustable. When switch M-II is actuated normally open contacts 462 are closed, completing a circuit to the solenoid B of the valve LV-I, thus admitting air to the air cylinder C-2 in a direction to elevate the screening rolls. This is of course necessary since the grooves into which the screening material is forced by the rolls, extend only to the corners of the frame and not to its extreme edges. The frames may advance a short distance as a result of inertia of the moving parts.

When the first frame of a sequence was placed in the machine by the operator, the manually operable stop 110 was placed in position. After the first frame was in proper position to initiate the operation, the stop 110 was rotated to the inoperative position shown in Figure 5, and thereafter proper positioning of succeeding frames is determined by the automatically operable stops 116.

As the screening rolls reach their upper position, the cam 310 on the cross shaft 64 operates the snap lock switch SN-I (Figure 11), thus completing a circuit which will initiate operation of the cut-off machine. However, as the first frame is advanced through the rolling machine, there are no screens in the cut-off machine.

As the screening rolls reach elevated position the stop pins 116 are raised in position to determine the advance of the series of screens. The operator at this time advances the next frame into the machine and pushes it forward to push the preceding frame into engagement with the stop pins 116. The parts at this time are in the relationship illustrated in Figure 9, normally open micro switch M-I being closed and normally open contacts 462 of micro switch M-II being open. At this time closure of the foot pedal switch 457 initiates a second cycle of the machine.

The cut-off machine will have been adjusted so as to locate the cut-off blade at the approximate position to pass between abutting transverse bars of adjacent screen frames. When the rolling operation of the second frame is completed, the leading edge of the first frame will be in approximate position beneath the cutting blade 420 of the cut-off knife. However, no cut-off operation is desired at this time. The leading edge of the first frame will close normally open micro switch M-VIII, but normally open micro switch M-IX which is in series with micro switch M-VIII, will remain open, and accordingly, no cut-off operation takes place when the snap lock switch SN-I is closed by elevation of the screening rolls to their upper position. However, locating pins 430 (Figure 18) will be in elevated position and would prevent advance of the screening rolls unless depressed. In order to depress these pins a manually operated switch 460 is provided which completes a circuit to solenoid A of the valve LV-III, thus completing a circuit to air cylinder C-4 in a direction to depress the locating pins.

As the next screen frame passes beneath the screen rollers, the trailing edge of the first frame passes the normally open micro switch M-VII, completing a circuit to solenoid B of the valve LV-III, which permits air to the air cylinder C-4 in a direction to elevate the cut-off locating pins 430.

The motor 70 will be de-energized as before by momentary opening of normally closed contacts 461 of micro switch M-II and the frames may advance due to the momentum of the parts. Just before the advancing screens come to rest, the trailing edge of the leading screen will engage the stop pins 430 and the cut-off device 376 will move a short distance until the series of frames comes to rest. This will position the cut-off blade 420 directly over the abutting surfaces between the adjacent transverse frame bars. At the same time, both of the micro switches M-VIII and M-IX will be closed. As the screening rolls reach upper position the snap lock switch SN-I will be closed, thus completing a circuit through micro switches M-VIII and M-IX to solenoid A of reversing valve LV-II, which will admit air to the air cylinder C-3 in a direction to cause the cutting knife to move downwardly, thus severing the screening material between adjacent frame sections and also cutting off portions of the splining material which extend beyond the ends of the grooves in the frames. As the cut-off knife initiates its downward movement, normally open micro switch M-VI is closed by a cam on the cross shaft 396, which completes a circuit to solenoid A of the valve LV-III, thus admitting air to the air cylinder C-4 in a direction to cause the locating pins 430 to move downwardly. This is desirable since the leading screen frame must be permitted to move forwardly as the knife blade 420 passes beneath the adjacent screen frames. At the end of the cutting stroke normally open micro switch M-V is closed by the cam 401, thus energizing solenoid B on the valve LV-II and admitting air to the air cylinder C-3 in a direction to elevate the cut-off knife. Thereafter, the operator is required only to feed frames into the machine so as to cause the leading edge of the frame last screened to engage the automatically operable stop pins 116 and to close the foot switch 457.

As the frames emerge from the first operation they are provided with individual sections of screening material rolled into two opposite grooves and short lengths of spline material extend outwardly beyond the ends of these two grooves.

Inasmuch as the tension set up in the screening material by the rolling operation may be substantial, it may have a tendency to bow the sides of the frame inwardly. In order to overcome this it may be desirable to provide the screen frame bars with a predetermined outward bow so that the inward bowing tendency in the tension of the screening material will merely correct this outward bow and the frame bars in the completed screen may be straight. However, if bars of the preferred rigidity are employed, this will not be necessary.

*Screening roll operation*

Referring now to Figures 22, 23, 23A and 23B, the precise operation of the screening roll will be described.

In these figures a bar of the screen frame is indicated at 463 having a groove or channel 464 therein for the reception of the edge of the screening material 465 and splining material 466. It will be observed that the bar of the frame includes a turned over edge 467 which is adapted to cooperate in locking the edge of the screening and splining material in place. The screening and splining roll 100 comprises an annular flange 468 which is adapted to enter into the groove 464 and to force the screening and splining material into the groove. Moreover, the roll includes an abutment flange 469 which is adapted to engage the outer edge of the screen bar 463. The dimension $d$ between the adjacent edges of the flanges 468 and 469 is deliberately made somewhat smaller than the dimension between the outside of the screen frame bar and adjacent inside surface of the groove 464. Furthermore, the channel of the frame includes a corner 470a. The arrangement of parts is such that as the flange 468 moves the screening and splining material into the groove 464, it cuts off the excess screening material at the corner 470a. When the material is forced into the groove as illustrated in Figure 22, it will be observed that it is to a substantial extent interlocked under the shoulder provided by the inturned edge 467.

The inner edge of flange 469 is beveled, as seen at 470, and operates as a camming surface to guide flange 468 into groove 464. For this purpose, roll 100 is splined to shaft 96 and is provided with spring 471 urging the roll against stop nut 472, which permits the roll to be cammed to the left as seen in Figure 23B against the action of spring 471.

In these figures, the spline guide 126 is illustrated as well as the inclined passage 128 through which the splining material is advanced. It will be observed that the splining material is retained in properly aligned position until just prior to engagement with the periphery of the flange 468 of the splining roll.

Spline guide 126 comprises a block which floats on roll 100 and is preferably urged downward against the upper surface of the screen frames by springs indicated at 473. Its lower surface constitutes a guiding shoe 474 as best seen in Figure 23B, and provides a guide seat 475 for spline material 466, as well as permitting downward movement of the splining flange 468 to the position illustrated in Figure 22. Guides 126 may rock about roll 100 and are primarily effective to locate spline material 466 in position to be pressed into the groove 464 as the flange 468 enters the groove.

SECOND OPERATION

Referring now to Figures 24–27, a second machine is provided whose function is to roll the edges of the screening material and appropriate splining material into the grooves at the other two sides of the screen frames. It will be recalled that the first machine has rolled the edges of the screening and splining material into two opposite sides of the screen frame and has thereafter severed the screening material and the splining material between adjacent frames. The second machine receives the frames so as to pass the unsecured edges of the screening material beneath the screening and splining rolls.

The mechanism of the second machine is generally similar to the first machine and hence will not be described in as great detail.

Referring now to Figures 24 and 25 the machine is illustrated as comprising a bed plate 480, a left side frame 481 which is fixed to the bed plate, and a right side frame 482 which is adjustable toward and away from the side frame 481, on ways indicated at 483, provided on a base 484. A hand wheel 485 connects to an adjusting screw which cooperates with a feed nut depending from the adjustable frame 482. This mechanism is not illustrated but is in all respects similar to the corresponding mechanism in the rolling machine for carrying out the first operation.

Rolling heads 486 and 487 are mounted for vertical movement on the frames 481 and 482 respectively, and are adapted to be raised and lowered by a hydraulic cylinder C–5 (Figure 28), which is connected to the supporting king posts 490 through pinions 491 and 492 interconnected by a cross shaft 493. The piston rod 494 is provided with rack teeth meshing with the pinion 491 and the king posts 490 are each provided with rack teeth cooperating with the teeth of the pinions 491 and 492. This mechanism is diagrammatically illustrated in Figure 28 and the cross shaft 493 appears in Figure 24.

Figure 28:
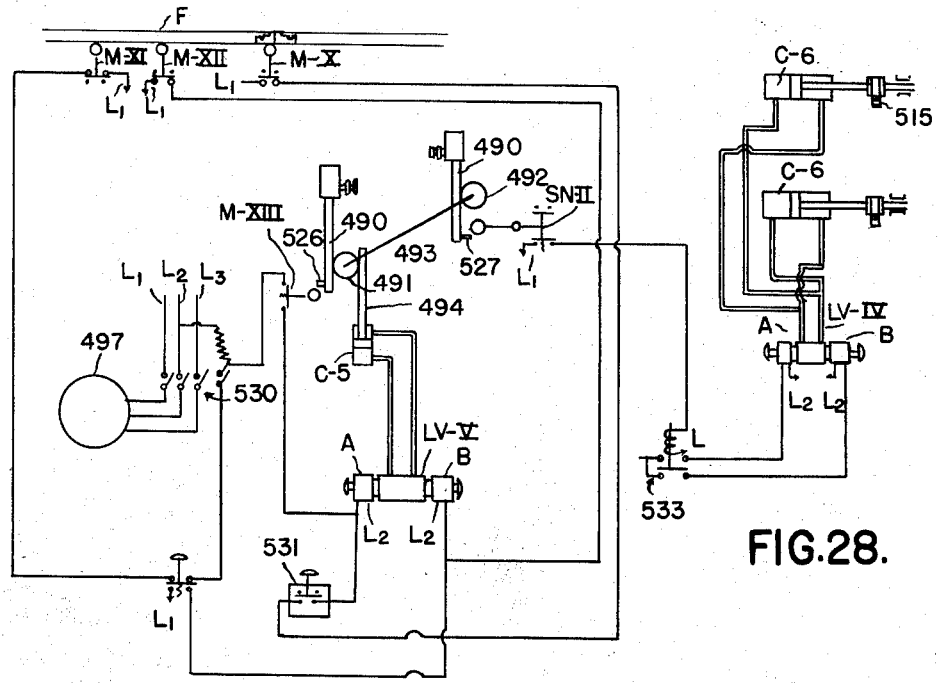
Figure 28 is a wiring and control diagram of the machine for performing the second operation.
Figure 26:
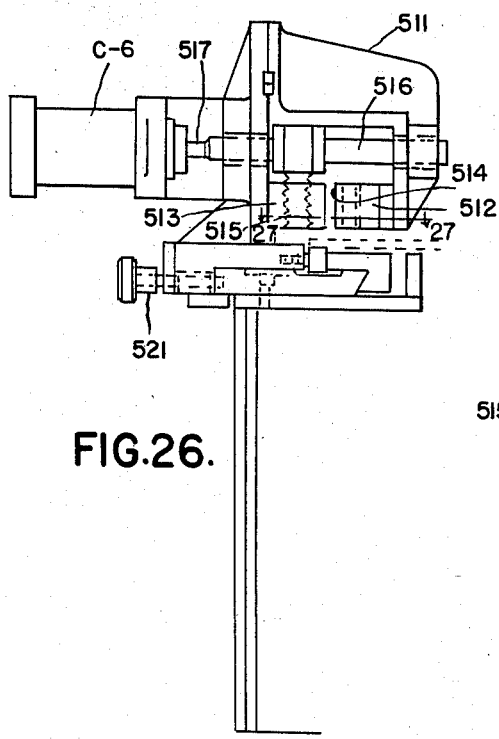
Figure 26 is a detailed front elevational view of the spline cut-off mechanism.
Figure 27:
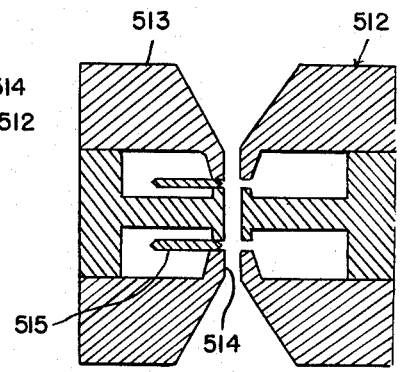
Figure 27 is a fragmentary section on the line 27—27, Figure 26.

Each of the heads 486 and 487 is provided with a screening and splining roll 496, and these parts are rotated by a motor 497 shown in the diagram of Figure 28. Rotation is transmitted from one head to the other through a cross shaft 498 as in the rolling machine in the first operation. Stop pins 499 are provided, and the frames are positioned with the rear side of their trailing cross bars against the sides of the pins away from the operator. Pins 499 are adjustable longitudinally of the machine to accommodate frames of different sizes.

In this case, since each of the screen frames is already provided with the portion of screening material to be applied, the means for supporting the roll of screening material is omitted. However, the machine is provided with a pair of splining reels 500 which may be in all respects identical to the splining reels illustrated in connection with the rolling machine of the first operation, and which may include the friction brakes 501 of the type previously described.

The splining material passes around a spline roll or cylinder 502, pulleys 503 and 504, and thence between guide rolls 505, to a spline guide block identical with that illustrated in connection with the rolling machine in the first operation.

It is also necessary in this machine to provide some fullness or slack transversely of the screening material so that the screening material may have a predetermined desired tension after the rolling operation is completed. For this purpose, buncher guides are provided, into which the edges of the partially attached screen are inserted as the frame is fed to the machine. These guides will push the edges of the screening material inwardly to provide a predetermined slack therein which will be taken up by the rolling operation.

The detailed construction of the buncher guides provided in this machine is best illustrated in Figures 24A and 24B. The buncher guides comprise an assembly made up of an upper plate 506, a lower plate 507 and an intermediate plate 508. The intermediate plate 508 as indicated at 508a has a curved contour over which the edge of the screening material is drawn so as to provide the desired fullness therein. The edge of the screening material as best seen in Figure 24B, is thus retained between the lower plate 507 and the upper plate 506 and the edges are forced inwardly by the inner edges of the intermediate plate 508. It will be recalled that at the time the partially completed screen is introduced into the machine for performing the second operation, the screening material has previously been rolled into the grooves located at two opposite sides of the screen. To some extent this renders the problem of introducing the screening material to the buncher guides in proper relation somewhat more difficult. To facilitate the handling of the screen and its proper introduction to the buncher guides, the lower plate 507 is provided with a short flat extension or finger 509. The extension 509 extends toward the operator of the machine. Since the corners of the screen have not as yet been rolled into place, these corners tend to curl upwardly and provide a space into which the projecting fingers 509 may easily be introduced. Preferably the fingers 509 are rounded and may if desired be provided with a tapered edge portion approaching a knife edge although rounded at the extremity to prevent catching on the screening material.

Inasmuch as each screen frame is applied with an individual section of screening material, it will be unnecessary to sever the screening material between frames. However, as the screened frames in this machine pass beyond the rolling heads, they will be interconnected by spline material. Accordingly, this machine comprises means for severing the spline material between adjacent frames. This spline cut-off mechanism is illustrated at 510 in Figure 25 and in detail in Figures 26 and 27. Briefly described, this mechanism comprises a frame 511 which supports a pair of guides 512 and 513 spaced apart to define a passage way 514 therebetween. The guides 512 and 513 are each composed of elements spaced apart to provide passage way for transverse horizontal movement of a pair of serrated cutting knives 515. The knives are bolted or otherwise secured to a rod 516 which in turn is connected to a piston rod 517 extending from an air cylinder C–6. In use the knives are caused to move transversely of the space 514 and to sever the splining material which at that time will be formed upwardly into a half loop therein, as illustrated at 519 in Figure 25. The spline cut-off mechanism 510 is adjustable longitudinally of the machine along ways indicated at 520 and may be secured in adjusted position corresponding to frames of different length by a spring pressed locating pin 521, which is adapted to be received in the appropriate one of a plurality of openings 522.

The manner in which the loop 519 of the spline material is caused to appear will now be described. When the machine comes to a stop after having rolled the screening material and spline material into one screen frame, and the rolling head has come to rest in elevated position, the operator places the next screen frame in position on the machine at the rear of the preceding screen frame. Thereafter, he pushes the preceding screen frame forwardly a short distance, as for example, a few inches, and then pulls the last screen frame back to proper position under the rolling heads. As soon as the rolling heads have lowered the rolls into engagement with the frame, the rolling motion of the rollers will advance the last inserted frame forwardly until it engages the preceding frame. At this time the length of spline material intermediate the two screens will be caused to extend upwardly into an arc in position to be severed by the knife blades 515.

In addition to the foregoing function, this operation performs a second useful purpose. As the frame is advanced into the machine, the edges of the screen are engaged in the screen bunchers and these tend to drag the edges of the screen out of proper position. However, the backward movement of the frames has the effect of restoring the screening material to proper condition for initiation of rolling.

Brake means are provided to insure that the leading frame remains in contact with the following frame at the spline severing stations and this is illustrated in Figure 25A as tapered brake blocks 523 urged upwardly by springs 524 and adjustable by bolts 525. Blocks 523 engage the leading edge of the screen and retard its advance, thus keeping its rear edge in engagement with the leading edge of the following screen.

The mechanism for effecting automatic operation of the machine is indicated in Figure 28, which is partly diagrammatic. In this figure, it will be observed that the spline severing knives 515 are actuated by air cylinders C–6, both of which are controlled by a reversing air valve LV–IV, having actuating solenoids indicated as A and B. The machine is provided with micro switches M–X, M–XI, and M–XII, which are in position to be actuated by the transverse bars of the screen frames. In addition, a micro switch M–XIII is provided which is in position to be actuated by a dog 526 which is illustrated as applied to the king post 490 of one of the rolling heads 486 or 487. Alternatively, the dog 526 could be provided on the pinion 491 as illustrated in connection with the rolling machine for the first operation.

A snap lock switch SN–II is provided for actuation by a dog 527 which is illustrated as applied to the other king post 490 but which of course could be arranged for actuation by a dog provided on one of the pinions 491 or 492. The motor 497 for rotating the screening rolls, is controlled by a magnetic contactor 530. The circuit is provided with a foot pedal switch 531. Control circuit lines are designated L₁ and L₂ and are partly omitted for simplicity in the diagram.

In the operation of the machine, the first frame is positioned so that its leading edge closes normally open micro switch M–X, thus completing a circuit to the foot starter pedal which when closed will complete the circuit to solenoid A of valve LV–V, admitting air to the cylinder C–5 to depress the rolling heads and to introduce the rolls into the grooves of the screen. As the rolling heads reach downward position, micro switch M–XIII is closed, thus completing a circuit to the solenoid of the magnetic contactor 530 and initiating operation of the motor 497. As the motor operates the frame advances until such time as the trailing edge of the frame contacts micro switch M–XI opening this closed switch, and interrupting a holding circuit through the solenoid of the magnetic contactor, thus de-energizing the motor. The motor and associated parts however, have sufficient momentum to continue advance of the frame for a further distance and at least until the trailing edge of the frame closes normally open micro switch M–XII, which completes a circuit to solenoid B of valve LV–V, thus reversing air to the cylinder C–5 and raising the rolling heads 486 and 487. As the rolling heads reach upper position switch SN–I is closed energizing the reversing relay 533 which will initially energize relay B of the valve LV–IV, admitting air to the cylinders C–6 to shift the cutting knives 515 transversely across the slot 514, thus severing the loop of spline material. The reversing relay 533 is then in condition to complete a circuit to the relays A of the air valve LV–IV, when snap switch SN–I is closed the next time. Thus knives 515 cut the splines in strokes which alternate as to direction.

If desired, a single micro switch having a pair of normally closed contacts serving the function of M–XI, and a pair of normally open contacts serving the function of M–XII, may be substituted for M–XI and M–XII, in which case coasting or momentum advance of the frame is not required.

It may be mentioned that the spline cut-off mechanism need not be adjusted so accurately as the screening material severing mechanism in the first operation since a loop of spline material of substantial size is presented and the spline cut-off mechanism may be located in position to sever this loop, even though the loop is not always in precisely the same position.

As the frames emerge from the machine for performing the second operation, the screening material will be rolled into the grooves provided at the four sides thereof throughout the major portion of the grooves, but it will not be rolled completely into the intersection of the corners inasmuch as the flange of the screening rolls cannot enter these corners. Moreover, there will be short lengths of spline material extending outwardly from each groove beyond the corner. Accordingly, another operation is necessary to complete the screen.

It will further be understood that the screening rolls if desired, could be of larger diameter and have the rolling flange discontinuous and timed to roll the screening material fully into a corner at the end of a frame channel. This would avoid the use of the third operation described herein.

THIRD OPERATION

The mechanism for completing the screen by pressing the screening and splining material into the corners of the frame grooves and for severing excess screening and splining material is illustrated in Figures 29–36.

Figure 29:
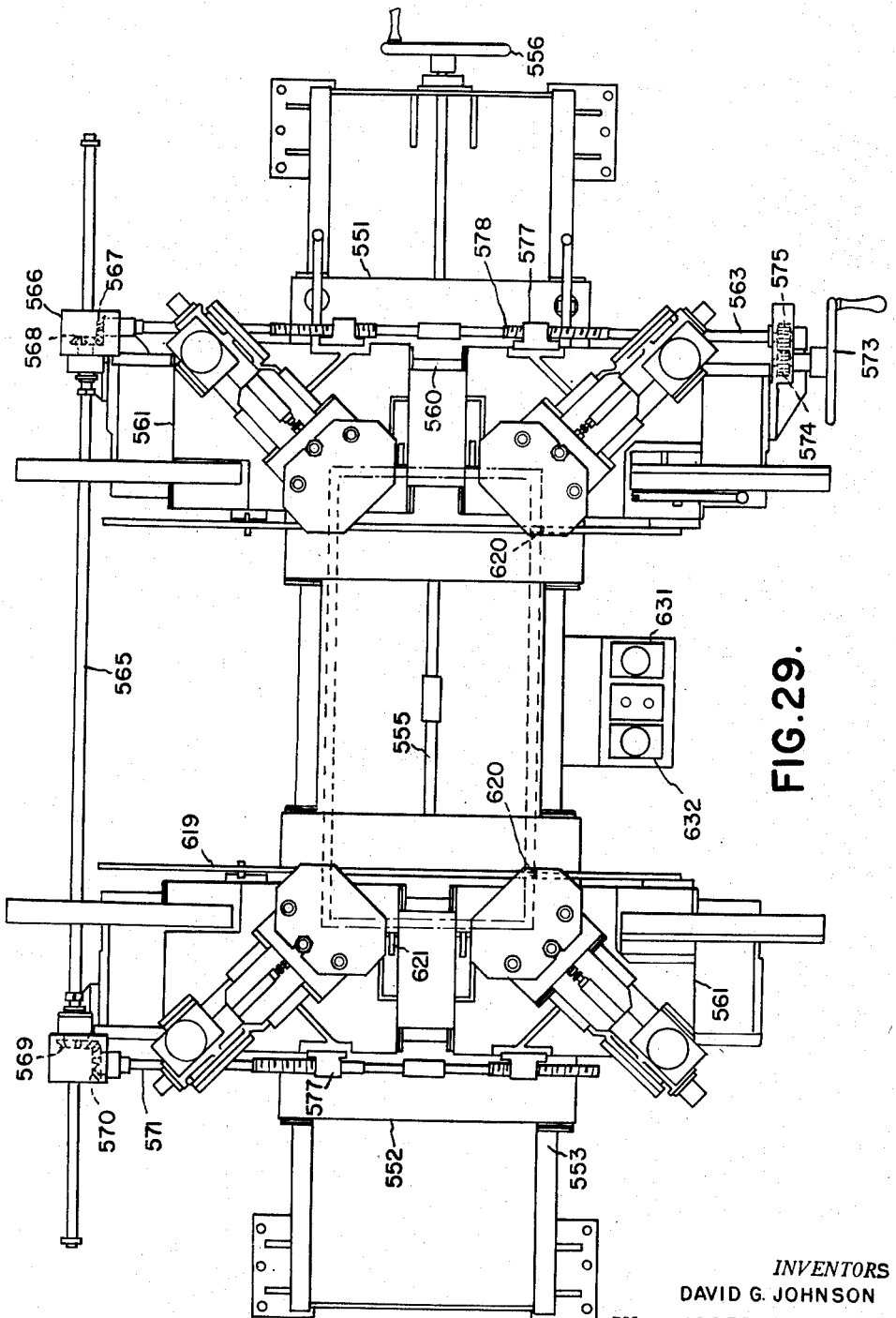
Figure 29 is a plan view of the machine for applying screening and splining material to the corners of the screen.
Figure 30:
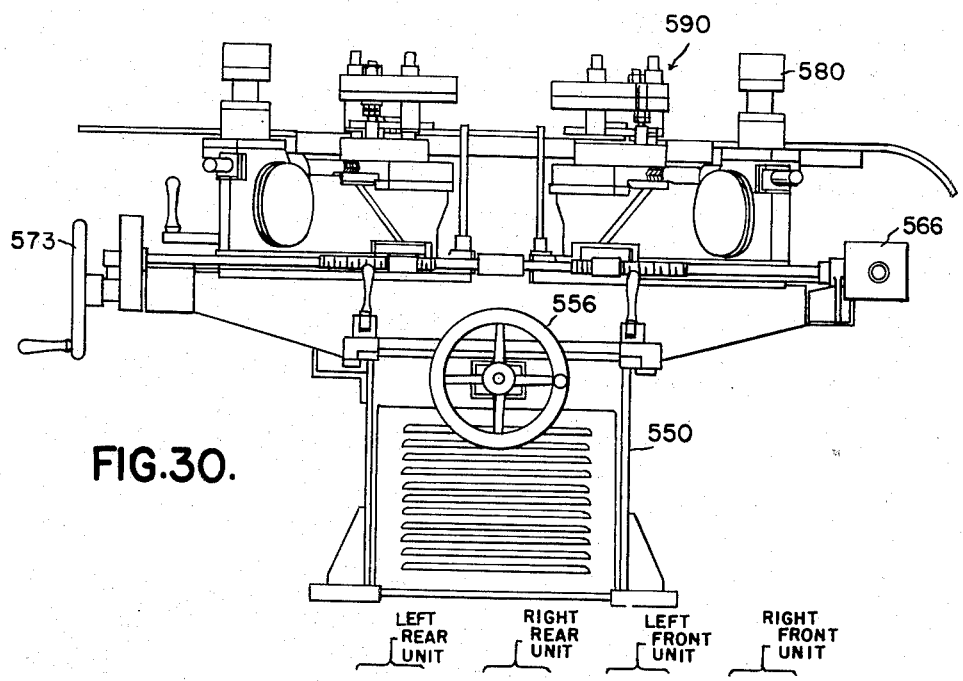
Figure 30 is a side elevation of the machine illustrated in Figure 29.

This machine comprises a base 550 having a pair of sub-slides 551 and 552 movable toward and away from each other along ways indicated at 553 in Figure 29. Means are provided for moving the sub-slides 551 and 552 simultaneously either toward or away from each other and this means comprises a shaft 555 having a hand wheel 556 carried by the base 550, the shaft 555 having right and left hand threaded portions underlying the sub-slides 551 and 552.

The sub-slides 551 and 552 are each provided with a depending internally threaded feed nut for cooperation with the corresponding threaded portions of the shaft 555 which cooperates therewith. The shaft 555 is of course anchored in the base against longitudinal displacement and rotation of the hand wheel 556 results in simultaneous movement of the sub-slides 551 and 552 toward or away from each other.

Mounted on ways 560 on the sub-slides 551 and 552, are pairs of slides 561 and means are provided for moving the individual slides 561 of each pair toward or away from each other. This means comprises a first shaft 563 mounted on the sub-slide 551 and retained thereon against axial displacement. Intermediate the sub-slides 551 and 552 is a cross shaft 565. At the end of the shaft 563 is a gear box 566 containing a first bevel gear 567 keyed or otherwise secured to the shaft 563, and a second bevel gear 568 meshing with the bevel gear 567 and keyed to the shaft 565 in a manner to permit sliding movement thereon. At the opposite end of the shaft 565 is another bevel gear 569 slidable on the shaft 565 and meshing with a bevel gear 570 keyed or otherwise secured to a shaft 571 rotatably mounted but retained against axial displacement on the sub-slide 552. A hand wheel 573 effects rotation of the shaft 563 through a pair of gears 574 and 575 and rotation of the shaft 563 is transmitted to the shaft 571 through the bevel gears previously referred to, in any position of adjustment of the sub-slides 551 or 552. Each of the slides 561 has extending therefrom an adjusting nut 577, one nut of each pair being right hand and the opposite nut of each pair being left hand. The shafts 563 and 571 are provided with corresponding right and left hand threaded portions 578, the arrangement being such that rotation of the hand wheel 573 causes simultaneous approach or separation between the slides 561 of each pair.

Mounted on each slide 561 is a die assembly shown in detail in Figures 30–35. On the slide 561 is located an hydraulic cylinder 580 having a piston rod 581 extending downwardly therefrom, which is provided with rack teeth. Located in a housing provided on the slide 561 is a stub shaft 582 having a pinion 583 carried thereby which is adapted to mesh with rack teeth formed on the piston rod 581. The shaft 582 also carries a larger gear 585 which meshes with the teeth of a horizontal rack 588 mounted for reciprocation on the slide 561 in a direction diagonal to the position of a frame carried on the machine. At the inner end of the rack 588 there is secured the die head indicated generally at 590, and for precise adjustment of the die head relative to the rack, an adjusting bolt 591 is provided having threads of opposite hands at opposite sides thereof received in correspondingly threaded recesses provided at the end of the rack and in the die head 590.

Depending from the adjustable die head is a hydraulic cylinder 592 having a piston rod 593 secured to vertical shaft 594, which carries the movable die parts 595, these being secured thereto by adjusting nuts 596 and 597.

Cylinders 580 and 592 are designed to have stops for the pistons operating therein, and the pressure in the cylinders builds up after the pistons reach the end of the stroke. The connections between the pistons and dies are adjustable, and the increased pressure required to operate the sequence valve is therefore not applied to the parts moved by the pistons, since the pressure builds up only after the pistons have reached the end of their strokes.

Figure 33:
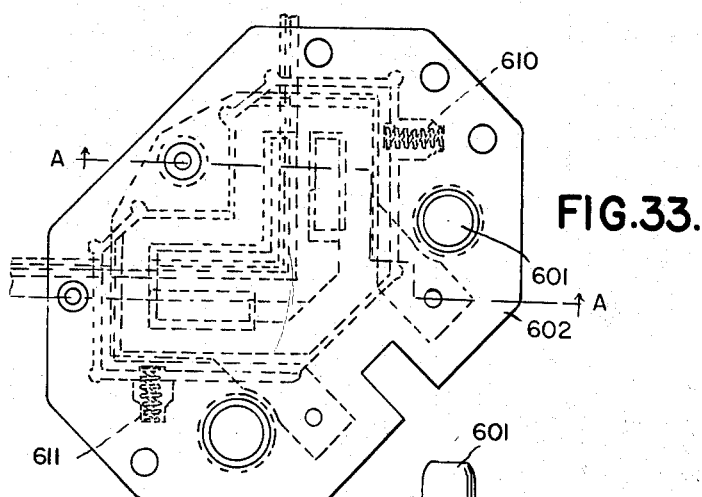
Figure 33 is a plan view of the bottom shoe of the die mechanism.
Figure 35:
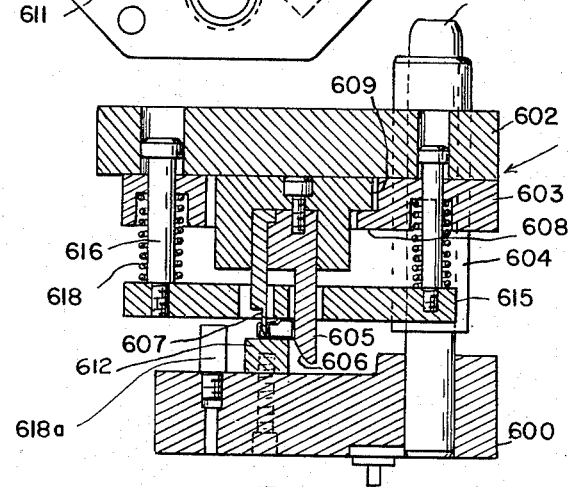
Figure 35 is a composite sectional view of the assembled die mechanism in which the bottom shoe is illustrated on the section line A—A, Figure 33, and the top shoe and associated mechanism is illustrated on the section line A—A, Figure 34.
Figure 34:
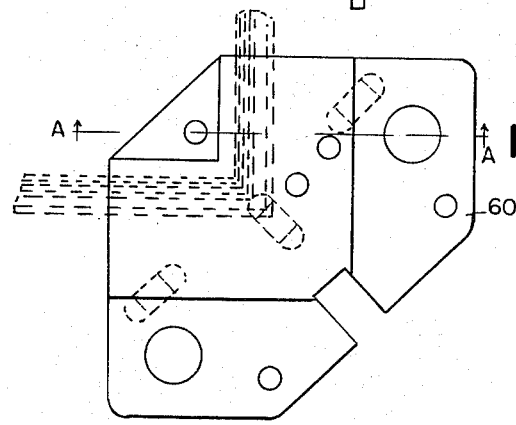
Figure 34 is a plan view of the top shoe of the die mechanism.

Referring now to Figures 33, 34 and 35, the die head 590 comprises a bottom shoe 600 having a pair of upstanding guide posts 601 carried thereby. Slidably mounted on the guide posts 601 is an assembly comprising a top shoe 602, a guide plate 603, and a die block 604. The die block has secured thereto a guide member 605 having a beveled edge 606 and a punch 607. The punch 607 has a narrow portion shaped to enter into the groove or channel of the screen frame to force the screening material and the splining material into the corners and to trim away the excess material. The die block 604 is slidably mounted for universal movement in a plane parallel to the adjacent surface of the top shoe and is held in position thereon by an overhanging ledge 608 formed on the guide plate 603, the die block having an outwardly extending flange 609 underlying the ledge 608 and cooperating therewith to retain the die block against the top shoe.

Compression springs indicated at 610 and 611 are provided urging the die block inwardly toward the center of the screen, but permit yielding as the beveled edges of the guide 605 engage the outside corners of the screen frame.

The bottom shoe 600 has a fixed die block 612 thereon which is of right angular shape and is adapted to underlie the groove or channel of the screen frame, and to back the screen frame up as the punch 607 enters the groove or channel.

A stripper plate 615 is carried by the top shoe and is secured thereto by stop bolts 616, the heads of which serve as stop elements against the upper surface of the guide plate 603. Compression springs 618 are provided intermediate the stripper plate and the guide plate and urge the stripper plate downwardly. With the parts in the relationship illustrated in Figure 35, it will be appreciated that upon upward movement of the punch, springs 618 will retain the stripper plate in its lowermost position, thus holding the screen frame on the fixed die blocks until the heads of the stop bolts 616 are engaged, thereafter elevating the movable die assembly and stripper plate as a unit.

If desired, fixed rigid stripper fingers (not shown) may be provided on locating pins 618a, and stripper plates 615 omitted.

Referring again to Figure 29, each of the slides 551 and 552 has secured thereto frame supporting bars 619. Adjacent the front of the machine where the starting switches are located, the bars 619 each have a shoulder indicated at 620 which faces away from the operator. After the machine has been properly adjusted for a particular size of frame, including adjustment of approximate side guide members 621, the operator pushes a screen frame into the machine onto the bars 619 and forwardly of the shoulders 620 thereon. Thereafter, he moves the screen frame back against the shoulders 620, which together with the side guide elements 621, approximately positions the screen for the next operation.

The die heads are controlled so that the right and left rear die heads move inwardly first into engagement with the corners of the screen frame, and locate the screen frame against the shoulders 620 previously referred to. Thereafter the right and left front die heads move into operative position.

The punches are then depressed to force the screening and splining material into the corners of the grooves or channels of the frame and to trim excess screening material, and are thereafter elevated and moved rearwardly with their respective die heads. The operator then introduces the next frame into the machine, at the same time pushing the completed frame forwardly out of the machine. Since the locating shoulders 620 face the rear of the machine, the completed screen may be ejected with a simple sliding motion and the next frame is moved forwardly of the shoulders and the die block back on the guide bars 619 into engagement with the shoulders 620.

The positioning of the die heads in registry with the corners of the screen frame, and the actuation of the punches to force the screening material and splining material into the corners and to trim such material, is accomplished by hydraulic cylinders.

Figure 36:
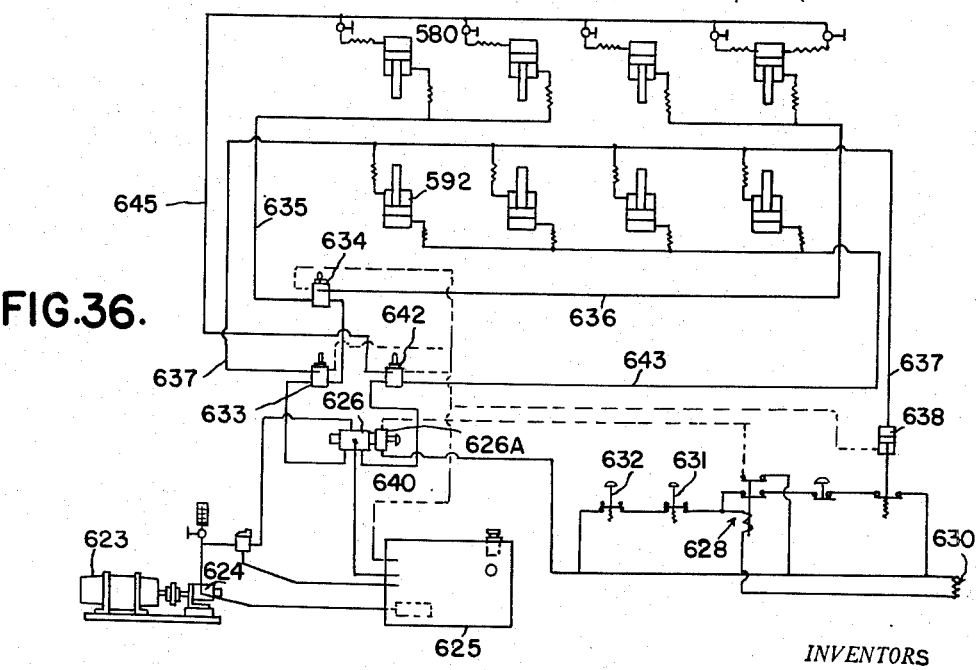
Figure 36 is a wiring and control diagram of the machine illustrated in Figures 29 and 30.
Figure 32:
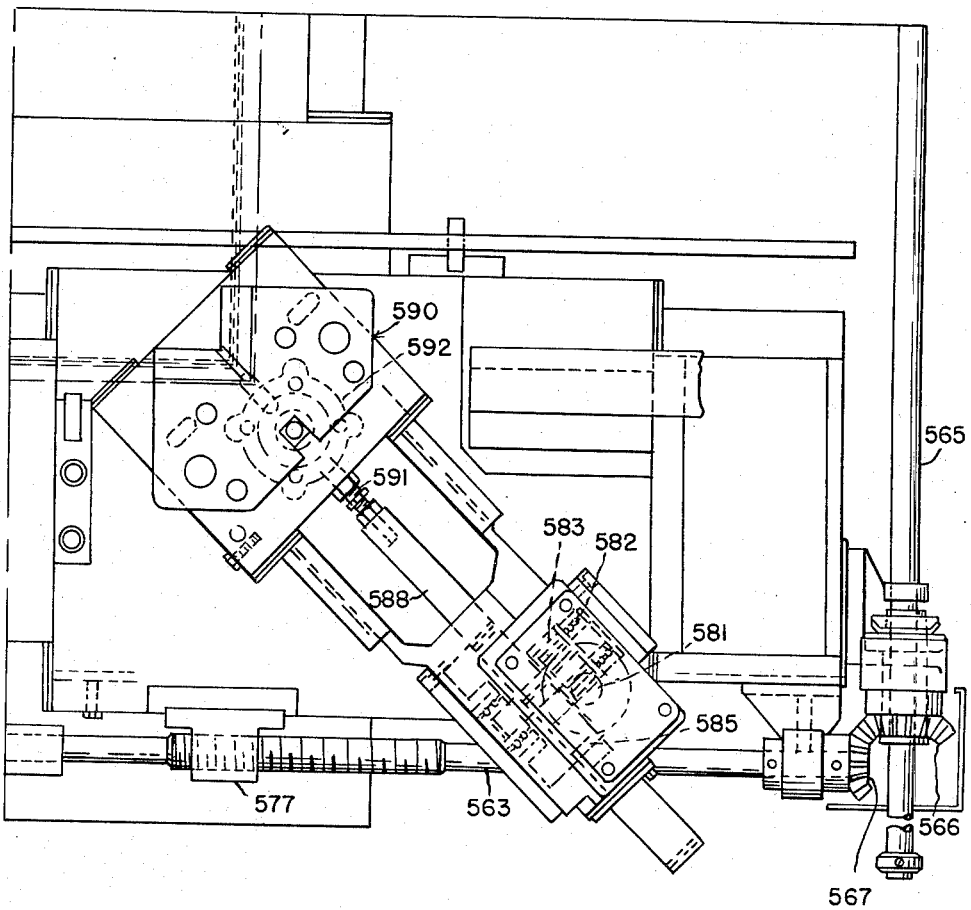
Figure 32 is a plan view of the structure illustrated in Figure 31.

Referring now to Figure 36 the hydraulic system and the electrical control mechanism therefor is illustrated.

The hydraulic system comprises a motor 623 connected to a hydraulic pump 624 which in turn is connected to an oil tank 625, all of this mechanism conveniently being housed within the base of the machine. A four-way solenoid control valve 626 is provided having a control solenoid indicated at 626A which is connected through a solenoid control switch 628 to a source of current indicated at 630. A pair of starting switches 631 and 632 are provided in series so that the operator is required to use both hands to initiate operation of the machine. Closure of switches 631 and 632 establishes a circuit through the solenoid of the switch 628, thus completing a circuit to the solenoid 626A as well as establishing a holding circuit through the solenoid of the switch 628.

Energization of the solenoid 626A operates the valve 626 to direct fluid through sequence and check valves 633 and 634 through the line 635, to the pair of cylinders 580 located at the left and right hand rear of the machine. This has the effect of moving the rear die assemblies diagonally forward an amount determined by stops on the piston rods. At this time, the forward edge of the screen is engaged against the stop shoulders 620 on the supporting bars 619. As soon as movement of the die heads has been arrested by the piston coming to the end of its stroke, pressure in the line 635 will build up and when it reaches a predetermined amount, as for example 200 pounds per square inch, the sequence valve 634 will open a passage to the line 636, which will admit fluid to the cylinders 580 at the left and right front of the machine. This will move the front die heads diagonally inwardly into operating position. When the pistons in the front cylinders 580 are arrested, pressure in the supply line will continue to build up, and at some higher pressure, such for example as 300 pounds per square inch, will operate the sequence valve 633 to admit fluid to the line 637, which will supply fluid to all four of the hydraulic cylinders 592 simultaneously, thus moving the punches down uniformly against the screen and performing the final operation thereon. When the punches reach their lower limit of motion, pressure in the supply line will continue to build up and will actuate the pressure switch 638 through the supply line 637. When this pressure reaches some predetermined higher value, such for example as 400 pounds per square inch, the pressure switch 638 will open, thus interrupting the holding circuit through the solenoid of the switch 628, thereby opening the circuit to the solenoid 626A. The valve 626 is so arranged that when the solenoid 626A is de-energized, fluid is directed through the line 640 to sequence valve 642, whence it is directed to the line 643 leading to the four cylinders 592, and connected thereto in a direction to cause the punches to be raised out of the frame channels.

When the punches are elevated to their limiting upper position, pressure in the line 643 increases and at some predetermined higher pressure, such for example as 300 pounds per square inch, the valve 642 operates to direct fluid to the line 645, which is connected to the opposite side of the cylinders 580 and will actuate these cylinders in a direction to cause the die heads to move diagonally outward in sufficient amount to clear the screen frames. This completes the cycle and it is necessary only for the operator to push the completed screen out of the machine with the next frame, to push the next frame against the stop 620, and to actuate both starting switches 631 and 632.

The shoulders 620 may function as approximate locators, and if desired inward movement of all four heads 590 may be simultaneous, since it is only necessary for the bevelled edges 606 of the guide members 605 to engage the outer edges of the frames.

While the foregoing operation has been described as designed to press the screening material only into the corners of the grooves and portions of the grooves directly adjacent the corners, it will of course be understood in the proper case the blades may be extended sufficiently so as to press the screening material not only into the grooved corners but also into the complete length of the groove intermediate the corners.

The apparatus for carrying out the present method has been disclosed as comprising three separate machines. This is primarily for the purpose of clarification of disclosure. It will be appreciated that if desired, the machine for carrying out the second operation could be located at the discharge side of the machine for carrying out the first operation, and the partially completed frames from the first operation advanced by friction rollers or similar means into proper starting position in the machine for carrying out the second operation. In like manner, the machine for carrying out the third operation could be located at the discharge side of the machine for carrying out the first operation so that the machine would be fully automatic and would require the operator to only position a frame in the machine for carrying out the first operation and closing the starting switch.

The drawings and the foregoing specification constitute a description of the improved method of screening frames by a continuous process using screening rolls in such full, clear, concise and exact terms as to enable any person skilled in the art to practice the invention, the scope of which is indicated by the appended claims.

What we claim as our invention is:

1. Apparatus for applying screening material to screen frames having channels therein for receiving the screening material comprising a frame support, a pair of rolls on said support having peripheral flanges shaped to enter a pair of the frame channels, means for supporting a continuous supply of screening material, means for effecting relative approach and separation between said rolls and frame support to cause said flanges to enter the channels in said frame and to force screening material therein, means for rotating said rolls and advancing the frame while said flanges are in said channels, the advance of said frame withdrawing screening material from the continuous supply thereof and said rolls pressing the screening material into the frame channels along the length thereof said rolls including abutment flanges having inclined camming surfaces engageable with the outside edge of the screen frame, said abutment flanges being rigidly spaced axially from said peripheral flanges an amount slightly less than the width of the frame bars between their channels and outside edges.

2. Apparatus in accordance with claim 1 in which said first mentioned rolls are mounted for limited axial movement to accommodate slight variations in screen frames.

3. Apparatus in accordance with claim 1 which comprises automatic control means responsive to provision of a screen frame in proper position for causing relative approach between said rolls and said support, other automatic control means operated by completion of said approach to initiate rotation of said rolls, and other automatic control means responsive to travel of a screen frame to a position in which its trailing edge approaches said rolls to terminate rotation of said rolls and to effect separation between said rolls and support.

4. Apparatus in accordance with claim 1 comprising means providing a continuous supply of splining material, and guide means for leading the spline material closely adjacent to the points of entry of the roll flanges into the frame channels.

5. Apparatus in accordance with claim 1 comprising automatically operated mechanical stop means on said support in position to engage a leading surface of a new frame to locate the new frame in position to be engaged by said rolls, and means for withdrawing said stop means prior to initiation of advance of said frame to permit advance of the frame and for restoring said stop means to frame locating position following termination of advance of said frame.

6. Apparatus in accordance with claim 5, comprising means responsive to relative approach and separation between said rolls and frame support to actuate said stop means.

7. Apparatus for applying screening material to channelled screen frames comprising a support on which a series of frames with screening material thereover advance, a pair of rolls above said support having peripheral flanges shaped to enter the frame channels, means for raising and lowering said rolls, means for rotating said rolls and advancing said frames while said rolls are in lowered position with their flanges engaged in said channels to apply screening material to the frames, a screen severing blade carried by said support beyond said rolls in the direction of advance of said frames, means for moving said blade transversely of said support between adjacent frames, automatic control mechanism comprising a device responsive to the presence of a frame in proper position below the rolls to control lowering thereof, a device responsive to completion of the lowering of the rolls to initiate rotation of said rolls and advance of said frame, means responsive to predetermined advance of the frame being rolled to terminate advance of said frame and to elevate said rolls, and means responsive to elevation of said rolls to initiate operation of said blade moving means.

8. Apparatus in accordance with claim 7 in which additional control means are provided to prevent severing movement of said blade except when a pair of frames are in position to cooperate with said blade.

9. Apparatus for applying screening material to channelled screen frames comprising means for advancing screen frames and applying screening material thereto including rolls beneath which the frames advance and peripheral flanges on said rolls shaped to press screening material into the channels of the frame, and converging guide means for forcing edge portions of the screening material inwardly to provide fullness transversely of the screening material in an amount to compensate for screening material forced into the frame channels.

10. Apparatus for applying screening material to grooved screen frames from a continuous supply of screening material, means for supporting a frame adjacent said screening material, rollers shaped to press said screening material into said grooves, means for rotating said rollers to advance said frames, advance of said frames drawing additional screening material beneath said rollers and adjustable tension means engaging the screening material intermediate the supply thereof and said rollers.

11. A roll for applying screening material to a metal screen frame having channelled bars, said roll having a screening flange shaped to enter the channel of a screen bar to force screening material therein, said roll having in addition a second flange spaced a fixed distance axially from said screening flange and having a conical portion tapering inwardly toward said screening flange and engageable with the outer surface of the screen bar, said spacing between second flange and screening flange being such that said second flange causes said screening flange to bear against the outer surfaces of the channel in the frame bar to sever excess screening material as the screening material is rolled into the channel.

12. Apparatus for applying screening material to a series of channelled frames which comprises an elongated frame support, means for advancing a series of frames over said support, means for feeding a continuous supply of screening material over said frames, means for feeding a continuous supply of splining material over said screening material in registry with the channels at opposite sides of the frames, rolls on said support for pressing screening material and splining material into the channels of said frames and for severing excess screening material at the outer edges of said channels during advance of said frames, and automatically operated means on said support beyond said rolls in the direction of advance of said frames for severing said screening and splining material between adjacent frames in timed relation to the advance of said frames.

13. Apparatus for applying screening material to a series of frames provided with channels to receive the screening material having lateral edges positioned to overlie the channels, comprising a base, a support for the screen frame, head means mounted on said base adapted to move toward and from said support, a pair of rolls mounted on said head means and adapted to rotate in unison and each having a peripheral flange shaped to enter a channel, power means to move said head means toward said support to cause said flanges to enter the channels to force the screening material therein, a second power means to rotate said rolls to move the frame and press screening material into the channels, and means actuated by movement of the frame being rolled to stop rotation of the rolls and cause the head means to move away from the support withdrawing the flanges from the channels as the trailing edge of the frame being rolled nears said rolls.

14. Apparatus for applying screening material to frames provided with channels to receive screening material having lateral edges positioned to overlie the channels, comprising a base, a support for the screen frame, a pair of heads mounted on said base adapted to move in unison toward and from said support, a shaft carried by each head, a roll mounted on each shaft adapted to rotate in unison and each having a peripheral flange shaped to enter a channel, power means to move said heads toward said support to cause said flanges to enter the channels forcing the screening material therein, a second power means to rotate said rolls moving the frame and screening material along said support and further forcing the material into the channels, and guide means for engaging the opposite edges of the screening material positioned adjacent said heads having the distance between guiding surfaces less than the normal width of the material.

15. Apparatus for applying screening material to frames provided with channels to receive screening material having lateral edges positioned to overlie the channels, comprising a base, a support for the frame on said base, means for holding a continuous supply of screening material, a pair of rolls mounted on said base adapted to move in unison toward and away from said support and adapted to rotate in unison and each having a peripheral flange shaped to enter said channel, power means to move said rolls toward and away from said support to cause said flanges to enter said channels forcing the screening material therein, a second power means to rotate said rolls moving the frame and screening material along said support and withdrawing a supply of screening material from said holder, a screen severing blade, power means operable in response to movement of said head away from said support to move said blade to sever the screening material.

16. Apparatus for applying screening material to frames provided with a channel to receive screening material having a lateral edge positioned to overlie the channel, comprising a base, a support for the frame, means for holding a continuous supply of screening material, a roll mounted on said base adapted to move toward said support, said roll having a peripheral flange shaped to enter the channel, power means to move said roll toward said support to cause said flange to enter the channel forcing the screening material therein, a second power means to rotate said roll moving the frame and screening material along said support and withdrawing a supply of screening material from said holder, a screen severing blade, and means to move said blade toward and from said roll to position said blade to accommodate for frames of different lengths.

17. Apparatus for applying screening material to frames provided with a channel to receive the screening material, comprising a base, a support for the screen frame, a head mounted on said base adapted to move toward said support, a shaft carried by said head, a roll mounted on said shaft, said roll having a peripheral flange shaped to enter the channel, power means to move said head toward said support to cause said flange to enter the channel forcing the screening material therein, a second peripheral flange on said roll spaced axially from said first mentioned flange and having a camming portion adapted to engage the lateral edge of the frame to guide said first mentioned flange into the channel.

18. Apparatus for screening a series of rectangular frames each of which is provided with channeled frame bars, the channels of which intersect at the corners of the frame, comprising a base, a support carried by said base over which the series of frames are advanced, a pair of flanged rolls carried by said support above said support the flanges of which are adapted to force screening material into the grooves at opposite sides of the frame, means for lowering said rolls toward said support to cause the flanges thereof to force screening material into a pair of opposite grooves, drive means connecting said rolls to rotate said rolls in unison to advance the frames, means responsive to predetermined advance of a frame to terminate advance thereof and to elevate said rolls, a stop carried by said support and located forwardly of the leading edge of the rear bar of the frame being rolled whereby the succeeding frame may be manually introduced to push the rear bar of the previously screened frame forwardly into engagement with the stop to locate the succeeding frame in proper position, and means operable automatically in timed relation to vertical movement of said rolls to move said stop into and out of operative position.

19. Structure as defined in claim 18 in which each of said rolls has associated therewith a portion adapted to bear against the outer surface of the frame bars containing the channels into which the screening material is being rolled, and spaced from the flanges thereof a distance sufficient to cause the flanges to bear forcibly against the outer wall of the channels to thereby sever the screening material.

20. Apparatus for applying screening material to a frame comprising bars having grooves or channels extending longitudinally of said bars for receiving the screening material, said apparatus comprising a frame support, means relatively movable longitudinally of a frame bar for inserting screening material into the grooves or channels of said frame and for simultaneously severing excess screening material adjacent the outer side of the groove or channels, said means comprising a device including a narrow element shaped to enter a groove or channel of the frame and to press screening material into the groove or channel, and a guide element having an inclined camming surface rigidly spaced laterally from said narrow element in position to engage the outer surface of the frame bar, means on said frame support mounting said device for limited movement in a direction transverse to said narrow element, actuating means for causing relative approach and separation between said device and said support to cause the inclined camming surface of said guide element to engage the outer surface of a frame bar to insure registration between said narrow element and the groove or channel of the frame bar upon relative approach between said device and support, the spacing between said narrow element and said guide element being such as to cause said narrow element to bear forcibly against the outer wall of the groove or channel so as to sever excess screening material adjacent the outer edge of the groove or channel.

21. Apparatus for applying screening material to frames which are provided with grooves or channels for receiving the material, comprising a frame supporting means, a pair of rolls on said frame supporting means, said rolls each having two axially spaced flanges, power means for effecting relative approach and separation between said rolls and frame support to cause one of the flanges of each roll to enter a channel and force the material therein, power means for providing relative motion between rolls and frame along the length of the channel, the second of said flanges of each roll being spaced from the channel entering flange a distance sufficient to cause the last mentioned flange to bear forcibly against the outer wall of the channel to thereby sever excess screening material.

22. Apparatus for applying screening material to screen frames having channels therein for receiving the screening material comprising a longitudinally extending frame support, a pair of rolls carried by said support having peripheral flanges shaped to enter a pair of frame channels at opposite sides of the frames, means for supporting a continuous supply of screening material, means for effecting relative approach and separation between said rolls and frame support to cause said flanges to enter the channels in said frame and to position screening material therein, means for rotating said rolls and advancing the frame while said flanges are in said channels, to withdraw screening material from the continuous supply thereof and to press the screening material into the frame channels along the length thereof, mechanism for severing the continuous screening material between adjacent ones of a series of frames advanced past said rolls, said severing mechanism comprising blade support mechanism carried by and movable longitudinally of said frame support in a position beyond said rolls in the direction of frame movement, a blade movable on said blade support mechanism in a direction transverse to said frame support, said blade support mechanism including abutment means engaged by a portion of a screen frame advanced over said frame support to move said blade support mechanism into a position such that said blade is in registration with a line determined by the engagement between frame bars of a pair of adjacent screen frames, and means operable to effect cutting movement of said blade while said blade support mechanism is in such position.

23. Apparatus for applying screening material to screen frames having channels therein for receiving the screening material comprising an elongated frame support having means thereon for movably supporting a series of frames for longitudinal advance, a pair of screen assembling rolls having peripheral flanges shaped to enter a pair of the frame channels, means intermediate the ends of said frame support for supporting said rolls, means for supporting a continuous supply of screening material, means for relatively moving said rolls and frame support to cause said flanges to enter the channels in said frame and to separate said rolls and frame, means for rotating said rolls and simultaneously advancing the frame while said flanges are in said channels to advance said frame and withdraw screening material from the continuous supply thereof and to press the screening material into the frame channels along the length thereof, the advance of one frame during the rolling operation being effective to push the previously rolled frame ahead of it, means for arresting advance of the frame being rolled when its trailing edge approaches said rolls, screen severing mechanism carried by said support located beyond said rolls in the direction of advance of said screen frames and comprising a blade movable transversely of the direction of advance of said frames to sever the screening material between the trailing edge of one frame and the adjacent leading edge of the following frame, and automatic control means for initiating a severing operation while said frames are stationary.

24. Apparatus as defined in claim 23 in which said control means is automatically operable by completion of separation between said rolls and frame to initiate severing movement of said blade.

25. Apparatus for applying screening material to grooved screen frames comprising a continuous supply of screening material, means for supporting a frame adjacent said screening material, rollers shaped to press said screening material into said grooves, means for rotating said rollers to advance said frames, advance of said frames drawing additional screening material beneath said rollers, adjustable tension means engaging the screening material intermediate the supply thereof and said rollers, and bunching means having inwardly inclined guiding surfaces engaging the edges of the screening material just prior to its engagement with said rollers.

26. Apparatus for applying screening material to screen frames having channels therein for receiving the screening material comprising a frame support, a pair of rolls having peripheral flanges shaped to enter a pair of the frame channels, means for supporting a continuous supply of screening material, means for effecting relative approach and separation between said rolls and frame support to cause said flanges to enter the channels in said frame and to force screening material therein, means for rotating said rolls and advancing the frame, means for supplying continuous spline material to said rolls, a spline guide for each of said rolls having a lower surface engageable with the upper surface of a frame, said guides having vertical slots intersecting their lower surfaces and passages leading to said slots, the flanges of said rolls being vertically movable relative to said guides in the said slots thereof between positions in which the bottom portions of said flanges are above and below the lower surfaces of said guides.

27. Apparatus as defined in claim 26 in which said guides are loosely mounted on said rolls, and resilient means urging said guides downwardly toward engagement with the screen frames.

28. Apparatus for applying screening material to a series of rectangular frames having frame bars provided with channels intersecting and terminating adjacent the corners of the frames comprising an elongated frame support, means for advancing a series of frames over said support with the trailing frame bar of one frame closely adjacent to the leading frame bar of the following frame, means for feeding a continuous supply of screening material over said frames, rolls on said support having flanges adapted to enter the channels at opposite sides of said frames to press screening material into said channels, means responsive to the position of frames on said support for raising said rolls as the trailing bar of each frame approaches said rolls and for lowering said rolls when the leading bar of each frame has advanced just beyond said rolls, screen severing means on said support located beyond said rolls in the direction of advance of said frames comprising a blade movable transversely of the path of advance of said frames, and means responsive to the position of frames on said support for moving said blade between the trailing bar of each frame and the leading bar of the following frame.

29. Apparatus as defined in claim 28 in which the means for advancing said frames comprises power means for rotating said rolls, whereby advance of said frames is interrupted when said rolls are raised, said means for moving said blade including control means on said support engaged by a frame thereon to effect operation of said blade while advance of said frames is interrupted.

30. A roll device for applying screening material to a metal screen frame having bars provided with longitudinal channels and for effecting relative movement between said device and frame longitudinally of a frame bar, said device comprising a roll having a first flange receivable in a channel to force screening material therein, said roll having a second flange spaced a fixed distance axially from said first flange and having a conical portion tapering toward said first flange and a flat portion engageable with the outer surface of a screen bar in the channel of which said first flange is received, power means for rotating said roll, the spacing between said first flange and the flat portion of said second flange being such that said flanges bear strongly against the outer surface of a frame bar and the outer wall of the channel therein to effect relative movement between said roll and frame bar longitudinally of the bar and to trim excess screening material at the outer side of the channel as the screening material is rolled therein.

References Cited in the file of this patent

UNITED STATES PATENTS

| Number | Name | Date |
|---|---|---|
| 739,343 | Peregrine | Sept. 22, 1903 |
| 783,786 | Hoffman | Feb. 28, 1905 |
| 1,426,760 | Nickol | Aug. 22, 1922 |
| 1,487,302 | Willis | Mar. 18, 1924 |
| 1,493,480 | De Tour | May 13, 1924 |
| 1,556,234 | Maise | Oct. 6, 1925 |
| 1,665,203 | Delf | Apr. 10, 1928 |
| 1,714,468 | Espenschied | May 21, 1929 |
| 1,734,710 | Borchert | Nov. 5, 1929 |
| 1,832,524 | Bosley | Nov. 17, 1931 |
| 1,934,765 | Julien | Nov. 14, 1933 |
| 2,108,638 | Benedict | Feb. 15, 1938 |

(Other references on following page)

UNITED STATES PATENTS

| Number | Name | Date |
|---|---|---|
| 2,142,438 | Faively | Jan. 3, 1939 |
| 2,144,570 | Harrison | Jan. 17, 1939 |
| 2,158,656 | Frank | May 16, 1939 |
| 2,190,611 | Sembdner | Feb. 13, 1940 |
| 2,200,605 | Pierce | May 14, 1940 |
| 2,343,043 | Brugmann | Feb. 29, 1944 |
| 2,346,347 | Balfe | Apr. 11, 1944 |
| 2,362,088 | Payne | Nov. 7, 1944 |
| 2,364,494 | Upson | Dec. 5, 1944 |
| 2,371,816 | Frank | Mar. 20, 1945 |
| 2,422,952 | Dakin | June 24, 1947 |
| 2,435,738 | Crafton | Feb. 10, 1948 |
| 2,458,612 | Luzzatto et al. | Jan. 11, 1949 |
| 2,638,131 | Rohs | May 12, 1953 |